United States Patent
Maruoka et al.

(10) Patent No.: US 9,886,103 B2
(45) Date of Patent: Feb. 6, 2018

(54) BATTERY DRIVEN MOBILE DRAWING DEVICE, INCLUDING ELECTROMAGNETIC INDUCTION AND CAPACITIVE POSITION DETECTORS AND A CONTROL CIRCUIT FOR CAUSING A PARAMETER SETTING AREA TO BE DISPLAYED, AND A TEST DRAWING AREA TO BE DISPLAYED TRANSPARENTLY, SUPERIMPOSED, ON A PORTION OF A DRAWING IN AN IMAGE DISPLAY AREA OF A DISPLAY, FOR RENDERING A DRAWING USING AN ELECTRONIC PEN

(71) Applicant: Wacom Co., Ltd.

(72) Inventors: Isao Maruoka, Saitama (JP); Marcello Luppi, The Hague (NL); Susan Adam, Vancouver, WA (US); Jarrod Dunnihoo, Vancouver, WA (US); Juli Hidaka, Saitama (JP)

(73) Assignee: Wacom Co., Ltd., Saitama (JP)

( * ) Notice: Subject to any disclaimer, the term of this patent is extended or adjusted under 35 U.S.C. 154(b) by 432 days.

(21) Appl. No.: 14/221,091

(22) Filed: Mar. 20, 2014

(65) Prior Publication Data

US 2015/0049031 A1    Feb. 19, 2015

Related U.S. Application Data

(60) Provisional application No. 61/867,340, filed on Aug. 19, 2013.

(51) Int. Cl.
*G06F 3/0354* (2013.01)
*G06T 11/00* (2006.01)
(Continued)

(52) U.S. Cl.
CPC ........ *G06F 3/03545* (2013.01); *G06F 3/0481* (2013.01); *G06F 3/04845* (2013.01);
(Continued)

(58) Field of Classification Search
None
See application file for complete search history.

(56) References Cited

U.S. PATENT DOCUMENTS 5,577,188 A * 11/1996 Zhu ................... G06F 3/0481
715/202
5,581,670 A * 12/1996 Bier ................... G06F 3/0481
345/629

(Continued)

FOREIGN PATENT DOCUMENTS

| EP | 2600230 A2 | 6/2013 |
| JP | 2003-022156 | 1/2003 |
| JP | 2008-027352 | 2/2008 |

OTHER PUBLICATIONS

Chalazonitis et al., "How to Optimize Radiological Images Captured from Digital Cameras, Using the Adobe Photoshop 6.0 Program," Journal of Digital Imaging 16(2):216-229, Jun. 2003.
(Continued)

*Primary Examiner* — Joseph Haley
*Assistant Examiner* — Karin Kiyabu
(74) *Attorney, Agent, or Firm* — Seed Intellectual Property Law Group LLP

(57) ABSTRACT

A drawing device includes a sensor arranged in a superimposed relationship with a display device and having an indicator operation detection area sized to detect indictor operations in the image display area of the display device; a memory that stores drawing information; and a control circuit that renders a drawing in the image display area of the display device based on the drawing information stored in the memory. The control circuit causes a test drawing area
(Continued)

and a parameter setting area to be displayed superimposed on the drawing image that is displayed in response to a detection, by the sensor, of an indication operation by the indicator, the test drawing area enabling a drawing operation to be performed using the indicator, the parameter setting area enabling changes to parameters of the drawing information generated by the drawing operation in the test drawing area using the indicator. The control circuit causes the test drawing area to be displayed transparently with a portion of the drawing appearing through the test drawing area.

20 Claims, 15 Drawing Sheets

(51) Int. Cl.
    *G06F 3/0481*     (2013.01)
    *G06F 3/0484*     (2013.01)
    *G06T 3/40*     (2006.01)
    *G09G 5/377*     (2006.01)
    *G06F 3/048*     (2013.01)

(52) U.S. Cl.
    CPC ........ *G06F 3/04847* (2013.01); *G06T 11/001* (2013.01); *G06F 2203/04804* (2013.01)

(56) References Cited

U.S. PATENT DOCUMENTS

| | | | | |
|---|---|---|---|---|
| 5,617,114 A * | 4/1997 | Bier | .................... | G06F 3/0481 345/634 |
| 5,768,607 A * | 6/1998 | Drews | .................. | G06F 3/0481 715/203 |
| 6,128,013 A * | 10/2000 | Prabhu | .............. | H04N 1/00241 715/707 |
| 6,498,590 B1 | 12/2002 | Dietz et al. | | |
| RE41,731 E | 9/2010 | Dietz et al. | | |
| 7,898,529 B2 * | 3/2011 | Fitzmaurice | .......... | G06F 3/0481 345/173 |
| 2002/0048413 A1 * | 4/2002 | Kusunoki | .......... | H04N 1/00132 382/282 |
| 2003/0065590 A1 * | 4/2003 | Haeberli | ............ | G06Q 30/0621 705/26.5 |
| 2003/0071850 A1 * | 4/2003 | Geidl | .................... | G06F 3/0481 715/781 |
| 2003/0184586 A1 * | 10/2003 | Haraguchi | .............. | G06T 11/60 715/764 |
| 2005/0200909 A1 * | 9/2005 | Kim | ................... | H04N 1/00241 358/448 |
| 2006/0197751 A1 * | 9/2006 | Iijima | ................... | G06F 3/0481 345/173 |
| 2008/0024804 A1 | 1/2008 | Yamanaka et al. | | |
| 2009/0303199 A1 * | 12/2009 | Cho | .................... | G06F 3/04883 345/173 |
| 2009/0319897 A1 | 12/2009 | Kotler et al. | | |
| 2010/0223032 A1 * | 9/2010 | Reghetti | ................. | G06T 19/20 703/1 |
| 2011/0016419 A1 * | 1/2011 | Grosz | ................. | G06F 17/3028 715/769 |
| 2013/0135263 A1 * | 5/2013 | Omura | ...................... | G06F 3/03 345/179 |
| 2013/0207997 A1 | 8/2013 | Berger et al. | | |
| 2015/0358584 A1 * | 12/2015 | Mattson | ................... | H04N 7/15 348/14.08 |
| 2016/0140745 A1 * | 5/2016 | Natori | ..................... | G06T 11/60 345/629 |
| 2016/0179758 A1 * | 6/2016 | Perrin | ................... | G06F 17/212 715/259 |
| 2016/0364091 A1 * | 12/2016 | Bernstein | ............ | G06F 3/03545 |

OTHER PUBLICATIONS

Extended European Search Report, for European Application No. 14177757.3, dated Jan. 14, 2015, 9 pages.

\* cited by examiner

BATTERY DRIVEN MOBILE DRAWING DEVICE, INCLUDING ELECTROMAGNETIC INDUCTION AND CAPACITIVE POSITION DETECTORS AND A CONTROL CIRCUIT FOR CAUSING A PARAMETER SETTING AREA TO BE DISPLAYED, AND A TEST DRAWING AREA TO BE DISPLAYED TRANSPARENTLY, SUPERIMPOSED, ON A PORTION OF A DRAWING IN AN IMAGE DISPLAY AREA OF A DISPLAY, FOR RENDERING A DRAWING USING AN ELECTRONIC PEN

BACKGROUND

Technical Field

The present disclosure relates to a drawing device that renders an image of a drawing drawn using an indicator such as an electronic pen.

Description of the Related Art

A conventional drawing device can display an image of a drawing that includes graphics and text drawn with an indicator on a display device, and can store a drawing image displayed on the display device by detecting positions indicated by the indicator, which may be an electronic pen type of position indicator. The drawing device enables a user (e.g., a drawer) to render a desired drawing with various colors, line thicknesses, brightness levels, and the like by specifying parameters such as a pen thickness, a drawing color (e.g., a hue), and a brightness level for various portions of the drawing by based on inputs made with the indicator. Then, the drawing device stores the drawing image data in association with the specified parameters as drawing information. The drawing device also enables the parameters to be specified while the drawing is being rendered.

Additionally, a conventional image data output device enables adjustment of the image quality of image data to be printed. In the image data output device in this example, a large adjustment value setting area is used. The image quality of image data is adjusted based on input adjustment values. An image that has undergone image quality adjustment is displayed on a screen for verification of the effects of setting the adjustment values. Image data to be printed that has undergone image quality adjustment is output to a printer. For example, see Patent Document 1 (Japanese Patent Laid-Open No. 2008-27352).

It is common for a user to leave a parameter setting area displayed at the upper or left edge portion of a screen and to render a test drawing in accordance with parameters specified using a mouse or an electronic pen in the parameter setting area with the test drawing directly displayed superimposed on an image of a drawing being displayed. If the user is not satisfied with the test drawing, he or she deletes it, resets the parameters, and repeats rendering of a test drawing. In rendering a test drawing by making such operations, the task of specifying parameters and displaying a rendered test drawing superimposed on an image of a drawing being displayed is repeated until the user is satisfied with the test drawing. When the parameters are specified with the parameter setting area appearing at the upper or left edge portion of the screen, it is difficult to have a large display area for the parameter setting area if a large display area is used for the drawing image. In the case of a battery-driven mobile drawing device with a relatively small screen size, it is much more difficult to secure a sufficiently large parameter setting area.

Although the image data output device disclosed in Patent Document 1 enables verification of an adjustment effect resulting from the input of an adjustment value for the image, it is difficult to have a large display area for an image for verification of the adjustment effect. Moreover, the adjustment effect is verified for the entire image data to be printed. That is, a manual input process performed with an indicator such as electronic pen during rendering of a drawing is not verified for the adjustment effect.

In light of the foregoing, it is desirable to provide a drawing device for rendering a drawing using an indicator such as electronic pen that can solve the above-mentioned problems.

BRIEF SUMMARY

In order to solve the above-mentioned problems, a drawing device according to an embodiment of the present disclosure includes a display device, a sensor, a memory, and a control circuit. The display device has an image display area. The sensor is arranged in a superimposed relationship with the image display area of the display device and has an indicator operation detection area sized to detect indications operations in the image display area of the display device. The memory stores drawing information. The control circuit renders a drawing in the image display area of the display device based on the drawing information stored in the memory.

The control circuit causes a test drawing area and a parameter setting area to be displayed superimposed on the drawing in the image display area of the display device in response to a detection, by the sensor, of an indication operation performed using the indicator. The test drawing area enables the drawing operation to be performed using the indicator. The parameter setting area is used to change parameters of the drawing information generated by the drawing operation in the test drawing area using the indicator.

The control circuit causes the test drawing area to be displayed in a visually identifiable manner in the image display area of the display device and causes the test drawing area to be displayed transparently with a portion of the drawing in the image display area of the display device appearing through the test drawing area.

The drawing device performs a display process such that a portion of the image display area appears through the test drawing area. Therefore, rendering a test drawing in the test drawing area enables drawing information according to parameters set at the time of rendering the test drawing to be displayed superimposed on the drawing being displayed. This makes it possible to compare the test drawing information and the drawing displayed in the test drawing area, thus enabling desired parameters to be specified with ease.

Further, the drawing device displays the test drawing area in a visually identifiable manner in the image display area of the display device. As a result, the boundaries of the drawing in the image display area of the display device can be explicitly specified and compared to drawing information in the test drawing area generated using the indicator. This makes it possible to compare drawing information at the time of rendering a test drawing and a drawing being displayed with ease.

The display device performs a display process that displays test drawing information including parameters that can be set while a test drawing is rendered in a test drawing area that is superimposed on a drawing, which enables an image of the test drawing to be compared to an image of the drawing and provides an easy means of specifying desired parameters.

DETAILED DESCRIPTION

A description will be given below of a drawing device according to embodiments of the present disclosure with reference to the accompanying drawings.

Figure 1:
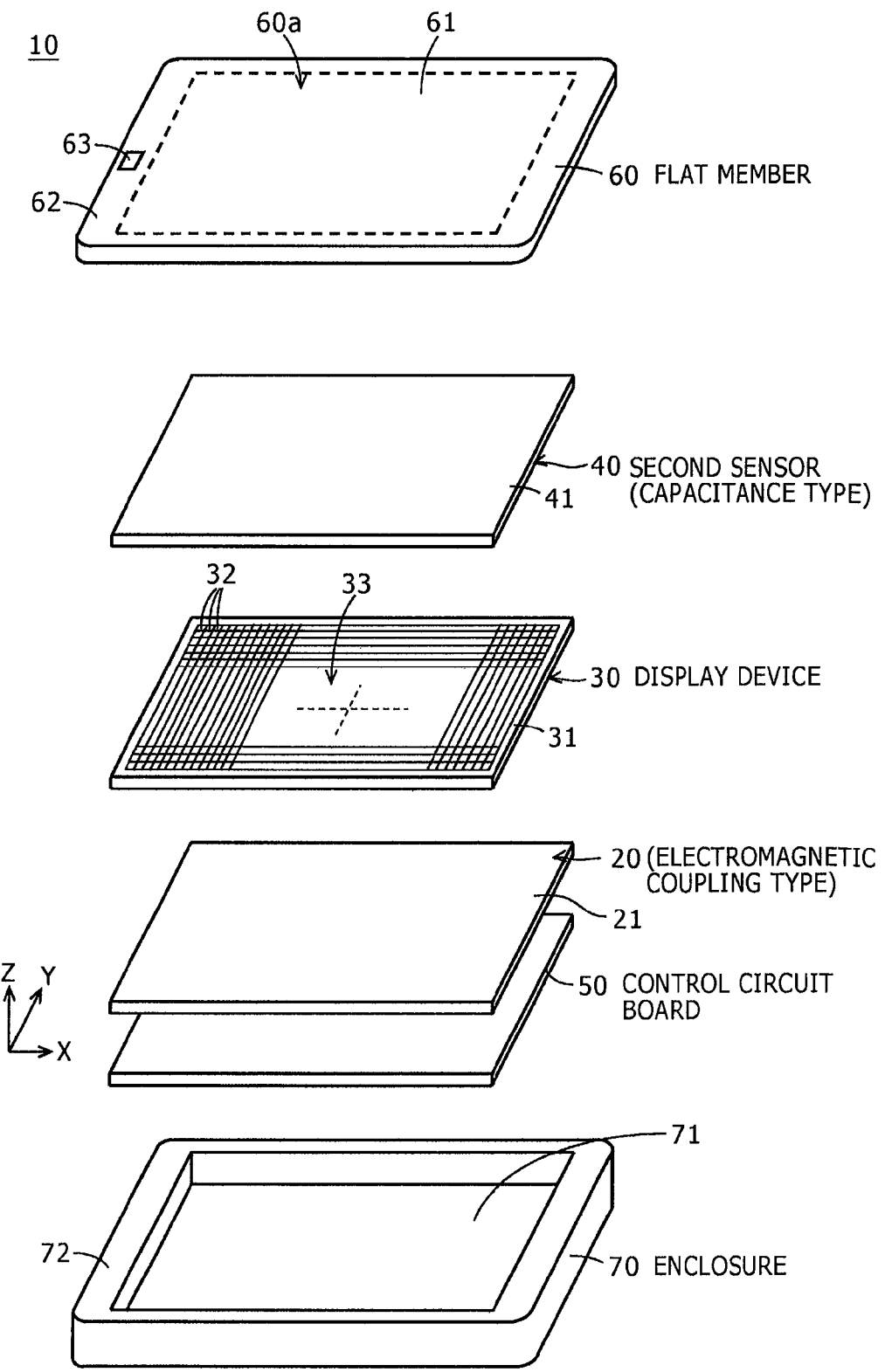
FIG. 1 is an exploded view of a drawing device according to an embodiment of the present disclosure.

FIG. 1 is an exploded view of a drawing device 10 according to an embodiment of the present disclosure. The drawing device 10 in the example of FIG. 1 incorporates two types of position detection techniques, namely, an electromagnetic coupling type of position detection technique and a capacitance type of position detection technique. That is, as for the electromagnetic coupling type of position detection technique, a position indicated by an indicator (hereinafter referred to as a first indicator) that includes a position indicator such as an electronic pen is detected by an electromagnetic coupling type of position detection sensor (hereinafter referred to as a first sensor). As for the capacitance type of position detection technique, on the other hand, a position on a display screen of a display device indicated by an indicator (hereinafter referred to as a second indicator) such as a finger or an electrostatic pen (a conductive pen-type of position indicator or a battery-driven so-called active electrostatic pen; hereinafter collectively referred to as an electrostatic pen) is detected by a capacitance type of position detection sensor (hereinafter referred to as a second sensor). The drawing device 10 is a battery-driven mobile terminal capable of detecting positions indicated by the first and second indicators simultaneously with the two sensors.

The drawing device 10 in this example includes a first sensor 20 of the electromagnetic coupling type for detecting a position of a first indicator, a display device 30, a second sensor 40 of the capacitance type for detecting a position of a second indicator, a control circuit board 50, a flat member 60, and an enclosure 70, as illustrated in FIG. 1.

The display device 30 includes a flat display such as liquid crystal or organic EL display with a display screen 33 having, on a display substrate 31, a number of display pixels 32 arranged not only in the X-axis direction (horizontally) but also in the Y-axis direction (vertically) orthogonal to the X-axis direction. The first sensor 20 is arranged on the rear side of the display screen 33 of the display device 30 in such a manner that the first sensor 20 and display device 30 are superimposed one above the other. Further, the second sensor 40 is arranged on the front side of the display screen 33 of the display device 30 in such a manner that the second sensor 40 and display screen 33 of the display device 30 are superimposed one above the other. Therefore, each of the first and second sensors 20 and 40 is arranged in a superimposed relationship with the display device 30.

A substantial indicator operation detection area of the first sensor 20 capable of detecting a position indicated by the first indicator, a substantial indicator operation detection area of the second sensor 40 capable of detecting a position indicated by the second indicator, and a display area of the display screen 33 of the display device 30, are approximately equal in size and arranged to lie one above the other in this example.

Although not shown in FIG. 1, an electromagnetic coupling type of position detection circuit (first position detection circuit) is connected to the first sensor 20, and a capacitance type of position detection circuit (second position detection circuit) is connected to the second sensor 40. The first and second position detection circuits are provided on the control circuit board 50, and the control circuit board 50 is connected to the first and second sensors 20 and 40, for example, by flexible cables. The control circuit board 50 has a control circuit, a display control circuit of the display device 30, other electronic components, and a copper foil wiring pattern. The control circuit includes a microcomputer to control, as a whole, a drawing process and a setting process for drawings processed using the drawing device 10.

The flat member 60 is made of a transparent material such as glass or resin, with one face 60a thereof serving as an operation surface adapted to indicate positions using the first indicator that includes an electronic pen and the second indicator such as a finger or an electrostatic pen. The second sensor 40 and display device 30 are arranged on a side of the flat member 60 that is opposite a side of the flat member 60 that includes the face 60a.

In this example, the flat member 60 has a shape slightly larger than that of the indicator detection area of the first and second sensors 20 and 40. That is, in the flat member 60 shown in FIG. 1, an area 61 surrounded by a dotted line is the indicator detection area of the first and second sensors 20 and 40, with an edge area 62 provided surrounding the area 61. Although not shown, the flat member 60 may be formed in such a manner that the edge area 62 is opaque, for example, by silk screen printing and that only the area 61 is transparent.

In the present embodiment, a pushbutton 63 is provided in the flat member 60. This pushbutton 63 is electrically connected to the control circuit board 50 so that the control circuit described above can detect the pressing of the pushbutton 63. As described later, the pushbutton 63 may serve as a button to request the display of a parameter setting menu.

The enclosure 70 is made, for example, of a synthetic resin. In the enclosure 70, a recessed portion 71 is formed to accommodate the first sensor 20, the display device 30, the second sensor 40, and the control circuit board 50. After the first sensor 20, the display device 30, the second sensor 40, and the control circuit board 50 are placed into the recessed portion 71, the edge area 62 of the flat member 60 is bonded to a frame area 72 of the enclosure 70, for example, with an adhesive to close the recessed portion 71, thus enabling the drawing device 10 to be assembled.

Figure 2:
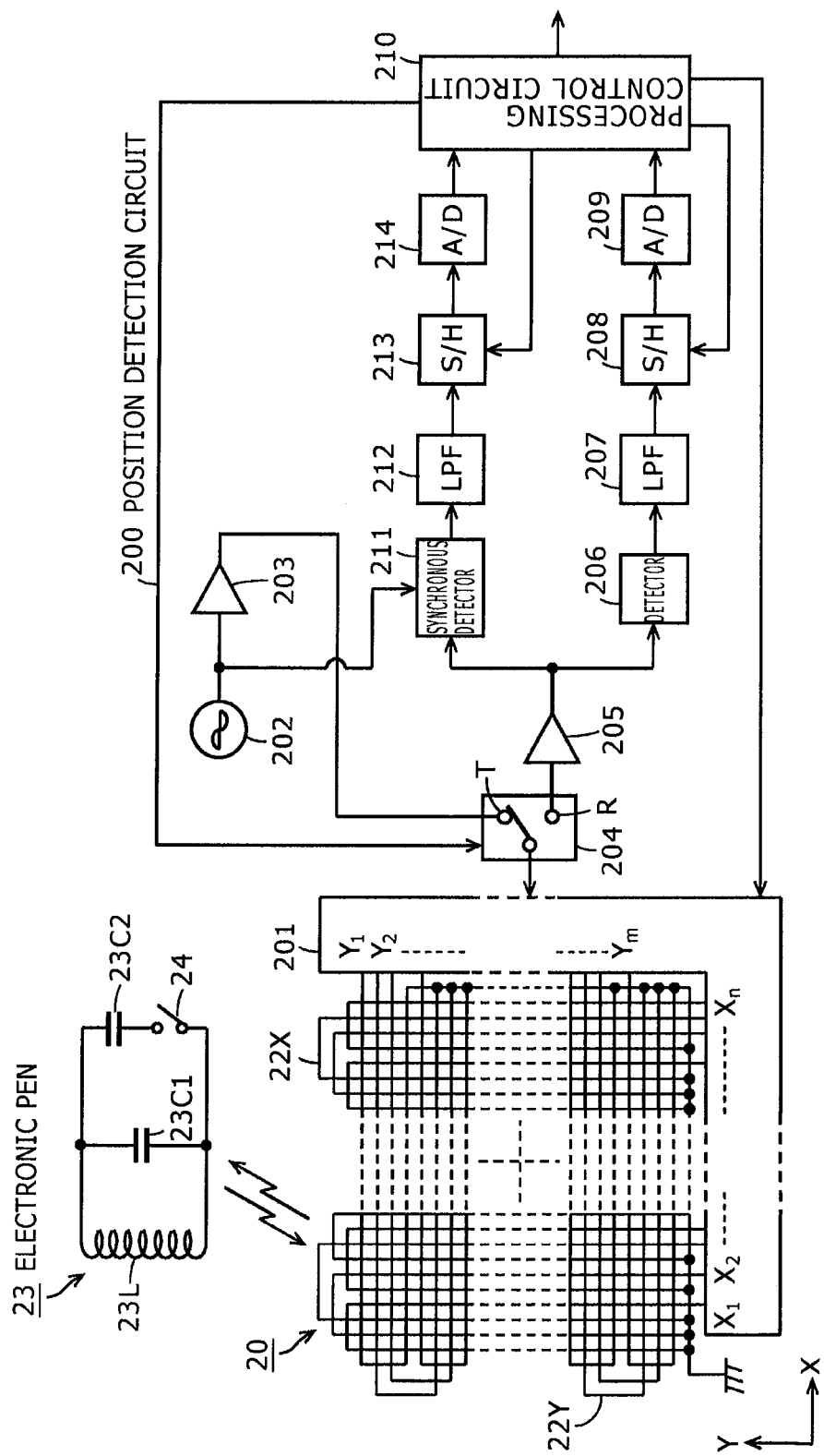
FIG. 2 is a schematic diagram of a first sensor and a first position detection circuit of the drawing device shown in FIG. 1, according to an embodiment of the present disclosure.

A description will be given next of a configuration example of the first sensor 20 of the electromagnetic coupling type and a position detection circuit 200 thereof with reference to FIG. 2. An electronic pen 23 as an example of the first indicator used together with the first sensor 20 in this example incorporates a resonance circuit. This resonance circuit includes a first capacitor 23C1 connected in parallel with a coil 23L and a series circuit, made up of a switch 24 and a second capacitor 23C2, connected in parallel with the coil 23L. The switch 24 is arranged in such a manner that a pressing portion of the switch 24 protrudes from a side circumferential face of an enclosure of the electronic pen 23, thus allowing a user to press the switch 24.

The second capacitor 23C2 is connected to or disconnected from the first capacitor 23C1 by switching on or off the switch (hereinafter referred to as a side switch) 24, thus changing the resonance frequency of the resonance circuit.

That is, the resonance frequency of the resonance circuit of the electronic pen 23 changes as the capacitance of the capacitor connected in parallel with the coil 23L is changed in response to switching-on or -off of the side switch 24. The position detection circuit 200 detects the operating status of the side switch 24 by detecting a frequency shift (phase) of the resonance frequency of the resonance circuit of the electronic pen 23.

The first sensor 20 includes an X-axis direction loop coil group 22X arranged on one face of a wiring board 21 (shown in FIG. 1) and a Y-axis direction loop coil group 22Y arranged on the other face of the wiring board 21. The X- and Y-axis direction loop coil groups 22X and 22Y each include a plurality of rectangular loop coils. In this example, n loop coils are arranged in the X-axis direction, and m loop coils in the Y-axis direction. The loop coils of the X- and Y-axis direction loop coil groups 22X and 22Y are arranged one above the other.

The loop coils making up the X-axis direction loop coil group 22X are arranged horizontally (in the X-axis direction) side by side at equal intervals in the detection area in such a manner as to be stacked one above the other. The loop coils making up the X-axis direction loop coil group 22X are adapted to detect a position indicated by the electronic pen 23. On the other hand, the loop coils making up the Y-axis direction loop coil group 22Y are arranged vertically (in the Y-axis direction) side by side at equal intervals in the detection area in such a manner as to be stacked one above the other. The loop coils making up the Y-axis direction loop coil group 22Y also are adapted to detect a position indicated by the electronic pen 23.

The position detection circuit 200 is connected to the first sensor 20. A selection circuit 201 is provided in the position detection circuit 200. The X- and Y-axis direction loop coil groups 22X and 22Y are connected to the selection circuit 201. The selection circuit 201 selects one loop coil out of the X- and Y-axis direction loop coil groups 22X and 312Y one after another.

Further, the position detection circuit 200 includes an oscillator 202, a current driver 203, a connection switching circuit 204, a reception amplifier 205, a detector 206, a low-pass filter 207, a sample-hold circuit 208, an A/D conversion circuit 209, a synchronous detector 211, a low-pass filter 212, a sample-hold circuit 213, an A/D conversion circuit 214, and a processing control circuit 210. The processing control circuit 210 includes, for example, a microcomputer.

The oscillator 202 generates an AC signal at a frequency f0. Then, the AC signal generated by the oscillator 202 is supplied to the current driver 203 and synchronous detector 211. The current driver 203 converts the AC signal supplied from the oscillator 202 into a current, and supplies the current to the connection switching circuit 204. The connection switching circuit 204 switches, under control of the processing control circuit 210, the destination (transmitting terminal T or receiving terminal R) selected by the selection circuit 201 to which the loop coil is to be connected. Of these destinations, the current driver 203 is connected to the transmitting terminal T, and the reception amplifier 205 is connected to the receiving terminal R.

The induced voltage generated by the loop coil selected by the selection circuit 201 is sent to the reception amplifier 205 via the selection circuit 201 and connection switching circuit 204. The reception amplifier 205 amplifies the induced voltage supplied from the loop coil, and transmits the amplified voltage to the detector 206 and synchronous detector 211.

The detector 206 detects the induced voltage generated by the loop coil, i.e., a reception signal, and transmits the signal to the low-pass filter 207. The low-pass filter 207 has a cutoff frequency sufficiently lower than the frequency 10 described above, and converts the output signal of the detector 206 into a DC signal and transmits the DC signal to the sample-hold circuit 208. The sample-hold circuit 208 holds a voltage level of the output signal of the low-pass filter 207 for a predetermined amount of time, and more specifically for a predetermined amount of time during reception, and transmits the voltage level to the A/D (Analog to Digital) conversion circuit 209. The A/D conversion circuit 209 converts the analog output from the sample-hold circuit 208 into a digital signal, and outputs the digital signal to the processing control circuit 210.

On the other hand, the synchronous detector 211 synchronously detects the output signal of the reception amplifier 205 with the AC signal from the oscillator 202, and transmits a signal whose level is proportional to the phase difference between the two signals to the low-pass filter 212. The low-pass filter 212 has a cutoff frequency sufficiently lower than the frequency f0, and converts the output signal of the synchronous detector 211 into a DC signal and transmits the DC signal to the sample-hold circuit 213. The sample-hold circuit 213 holds a voltage level of the output signal of the low-pass filter 212 for a predetermined amount of time, and transmits the voltage level to the A/D (Analog to Digital) conversion circuit 214. The A/D conversion circuit 214 converts the analog output from the sample-hold circuit 213 into a digital signal, and outputs the digital signal to the processing control circuit 210.

The processing control circuit 210 controls each section of the position detection circuit 200. That is, the processing control circuit 210 controls the selection of a loop coil by the selection circuit 201, the switching by the connection switching circuit 204, and the timings of the sample-hold circuits 208 and 213. The processing control circuit 210 causes the X- and Y-axis direction loop coil groups 22X and 22Y to transmit electromagnetic induction signals for a predetermined transmission continuation time based on the input signals from the A/D conversion circuits 209 and 214.

An induced voltage is generated by each of the loop coils of the X- and Y-axis direction loop coil groups 22X and 22Y because of an electromagnetic induction signal transmitted from a position indicator. The processing control circuit 210 calculates the coordinates of the position indicated by the position indicator in the X- and Y-axis directions based on the level of the induced voltage generated by each of the loop coils. Further, the processing control circuit 210 detects whether or not the side switch 24 has been pressed based on a signal level proportional to a phase difference between the transmitted and received electromagnetic induction signals.

As described above, the position detection circuit 200 can detect the position indicated by the electronic pen 23 using the processing control circuit 210. Moreover, the processing control circuit 210 of the position detection circuit 200 can detect whether or not the side switch 24 of the electronic pen 23 has been switched on by detecting the phase (frequency shift) of the reception signal. The processing control circuit 210 supplies the coordinate output resulting from the position detection and a detection output as to whether or not the side switch 24 has been switched on to the above-described control circuit adapted to control the processes such as a drawing process performed by the drawing device 10 as a whole.

Figure 3:
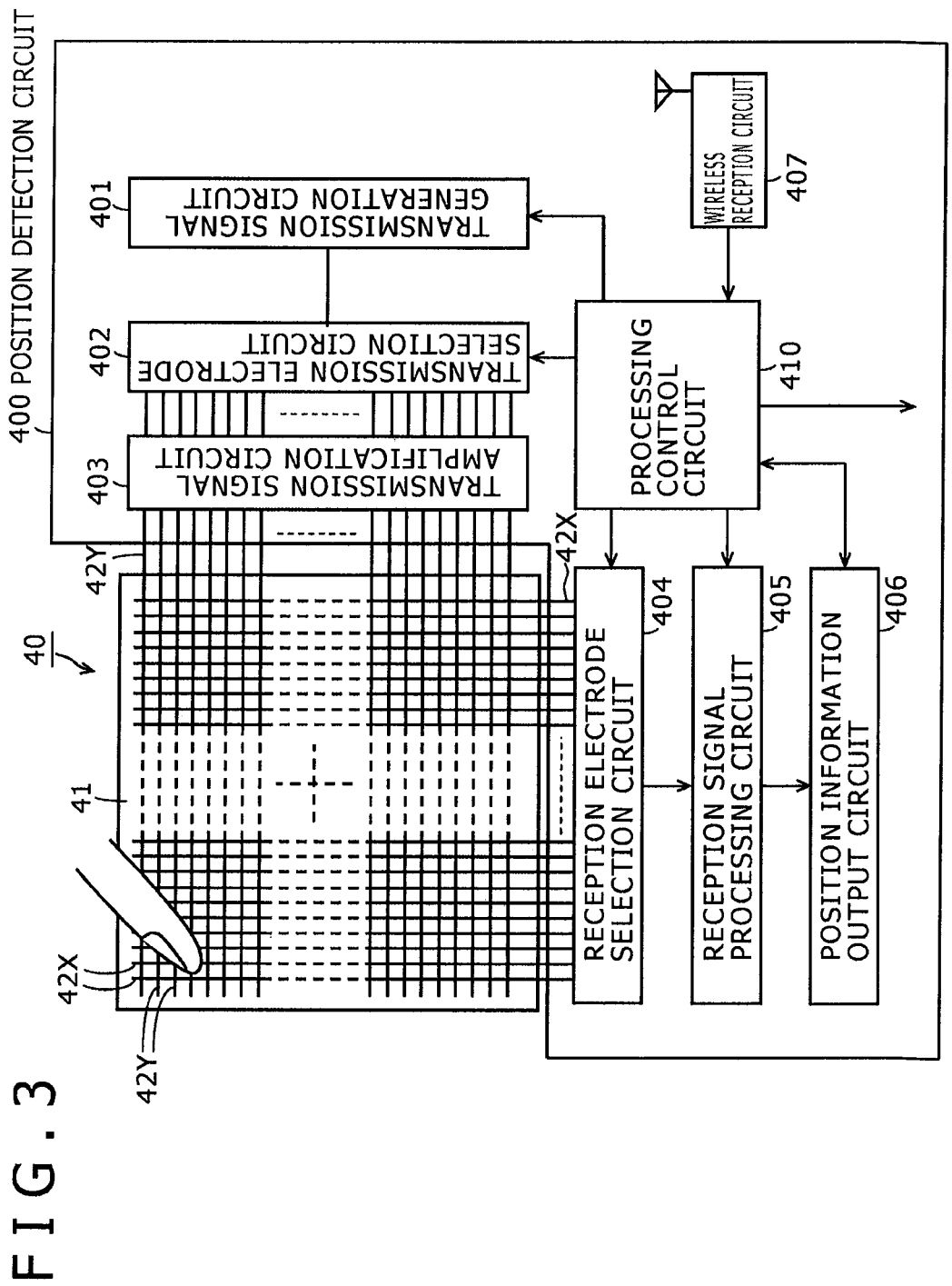
FIG. 3 is a schematic diagram of a second sensor and a second position detection circuit of the drawing device shown in FIG. 1, according to an embodiment of the present disclosure.

A description will be given next of a configuration example of the second sensor 40 and a position detection circuit 400 thereof with reference to FIG. 3. The second sensor 40 in this example is a crosspoint capacitance type of sensor that can simultaneously detect multiple touches by a plurality of fingers and electrostatic pens.

The second sensor 40 includes, for example, a transparent electrode group that includes a plurality of light-transmitting electrodes formed on one face (the face on the other side of the face opposing the display screen 33 of the display device 30) of a transparent substrate 41. The transparent substrate 41 is made, for example, of a glass substrate or resin film substrate.

The transparent electrode group includes a plurality of first transparent electrodes 42X, each formed in the Y-axis direction, and a plurality of second transparent electrodes 42Y, each formed in the X-axis direction orthogonal to the Y-axis direction. The first transparent electrodes 42X are arranged at predetermined intervals in the X-axis direction. On the other hand, the second transparent electrodes 42Y are arranged at predetermined intervals in the Y-axis direction. These first and second transparent electrodes 42X and 42Y are formed with a light-transmitting conductive material such as conductor made of ITO (Indium Tin Oxide) film.

The first and second transparent electrodes 42X and 42Y are formed on the same face of the transparent substrate 41 in this example. In the crosspoint areas, at the intersections between the first and second transparent electrodes 42X and 42Y that are orthogonal to each other, therefore, insulators are provided between the first and second transparent electrodes 42X and 42Y for electrical insulation therebetween.

The position detection circuit 400 is connected to the second sensor 40. The position detection circuit 400 includes a transmission signal generation circuit 401, a transmission electrode selection circuit 402, a transmission signal amplification circuit 403, a reception electrode selection circuit 404, a reception signal processing circuit 405, a position information output circuit 406, and a processing control circuit 410.

The position detection circuit 400 performs, under control of the processing control circuit 410, a position detection process discretely at predetermined time intervals, e.g., every 10 msec, and detects each of a plurality of position indications on the second sensor 40 by the second indicator, and acquires a position detection result for each position indication.

The transmission signal generation circuit 401 and transmission electrode selection circuit 402 make up a transmission signal supply circuit, whereas the reception electrode selection circuit 404 and reception signal processing circuit 405 make up a signal reception circuit. In this example, the first transparent electrodes 42X serve as reception electrodes, and the second transparent electrodes 42Y as transmission electrodes.

The transmission signal generation circuit 401 supplies, under control of the processing control circuit 410, a predetermined transmission signal to the transmission electrode selection circuit 402 at a predetermined times. An orthogonal spreading code, for example, can be used as the predetermined transmission signal (see, for example, Japanese Patent Laid-Open No. 2003-22158).

The transmission electrode selection circuit 402 selects a predetermined second transparent electrode 42Y under control of the processing control circuit 410. A transmission signal is supplied to the second transparent electrode 42Y selected by the transmission electrode selection circuit 402 from the transmission signal generation circuit 401 via the transmission signal amplification circuit 403.

The reception electrode selection circuit 404 selects the first transparent electrodes 42X one after another under control of the processing control circuit 410, and supplies the reception signal from the selected first transparent electrodes 42X to the reception signal processing circuit 405.

The reception signal processing circuit 405 detects, under control of the processing control circuit 410 and with the first transparent electrode 42X, a change in a reception signal resulting from an indication of a position on the second sensor 40 by the second indicator such as a finger or an electrostatic pen, and supplies a detection output to the position information output circuit 406.

The position information output circuit 406 generates, under control of the processing control circuit 410, a coordinate output, an indicated position detection signal corresponding to the position indicated by the second indicator such as a finger or an electrostatic pen, as a position detection result from the detection output of the reception signal processing circuit 405, the first transparent electrode 42X that produced the change in signal, and the second transparent electrode 42Y supplied with a transmission signal at that moment, and transmits the coordinate output to the processing control circuit 410.

Although not shown, the electrostatic pen includes a side switch as does the electronic pen 23. Further, the electrostatic pen includes a wireless transmission circuit adapted to wirelessly transmit information indicating that the side switch has been switched on by a user, if the user has done so. The position detection circuit 400 includes a wireless reception circuit 407 adapted to receive a signal transmitted from the wireless transmission circuit of the electrostatic pen. The wireless reception circuit 407 monitors signals transmitted from the electrostatic pen, and supplies information indicating that the side switch of the electrostatic pen has been switched on to the processing control circuit 410 when a transmission signal to that effect is detected.

The processing control circuit 410 supplies the coordinate output resulting from the position detection and information from the wireless reception circuit 407 as to whether or not the side switch has been switched on to the control circuit adapted to control the processes such as a drawing process performed by the drawing device 10 as a whole.

As described above, the drawing device 10 according to the present embodiment includes not only the first sensor 20 of the electromagnetic coupling type and the position detection circuit 200 thereof but also the second sensor 40 of the capacitance type and the position detection circuit 400 thereof, making the drawing device 10 capable of simultaneously detecting positions indicated by the first indicator (e.g., an electronic pen) and the second indicator (e.g., a finger or an electrostatic pen). The control circuit of the drawing device 10 not only performs processes including controlling changes made to the display image of the display device 30 in accordance with the detection results of the positions indicated by the first and second indicators but also detects operations adapted to move the first and second indicators (gesture operations) so as to perform a control process appropriate for the detection result thereof.

Figure 4:
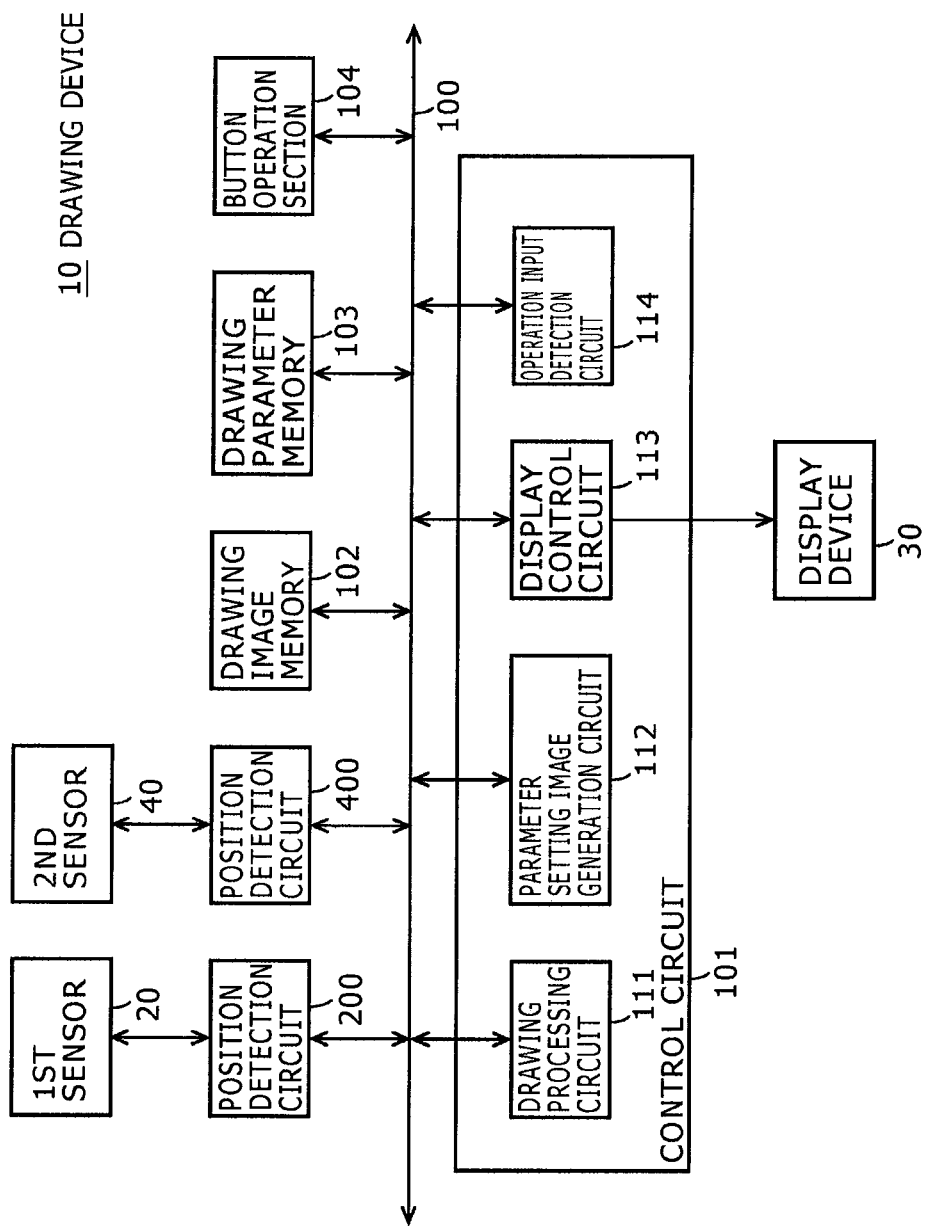
FIG. 4 is a block diagram of the drawing device shown in FIG. 1, according to an embodiment of the present disclosure.

FIG. 4 is a block diagram of the drawing device 10. The drawing device 10 includes a control circuit 101 that is formed on the control circuit board 50 shown in FIG. 1.

As shown in FIG. 4, the control circuit 101 is connected to the position detection circuits 200 and 400, a drawing image memory 102, a drawing parameter memory 103, and a button operation section 104 via a system bus 100. As described earlier, the first sensor 20 is connected to the position detection circuit 200, and the second sensor 40 to the position detection circuits 400.

The drawing image memory 102 stores drawing image information such as images, graphics, and text drawn by the first and second indicators on the display screen of the display device 300 and is capable of storing a plurality of pieces of drawing image information. The drawing image memory 102 can store drawing image information divided into a plurality of layers. Although the drawing image information is in a bitmap format in this example, the drawing image information may be in a vector format.

The drawing parameter memory 103 stores various parameters, which are used during rendering of the drawing image information stored in the drawing image memory 102, in association with the drawing image information. In this example, the drawing parameter memory 103 stores the parameters for each pixel dot (bit) of a drawing image. It should be noted that drawing information includes the drawing image information and the parameter information, and the drawing image information and the parameter information may be stored in a common single memory.

The button operation section 104 transmits operation information indicating that the pushbutton 63 shown in FIG. 1 has been pressed to the system bus 100, if a user has done so.

Although not shown, the control circuit 101 includes a microcomputer having a CPU (Central Processing Unit), a program ROM (Read Only Memory), and a work area RAM (Random Access Memory). The control circuit 101 includes a drawing processing circuit 111, a parameter setting image generation circuit 112, a display control circuit 113, an operation input detection circuit 114, and other circuits for implementing processing capabilities of a software program stored in the program ROM. Processing capabilities of the drawing processing circuit 111, the parameter setting image generation circuit 112, the display control circuit 113, and the operation input detection circuit 114 are implemented as the CPU making up the control circuit 101 reads an appropriate program from the program ROM and executes it in the work area RAM. It should be noted that the display control circuit 113 is connected to the display device 30 and includes a buffer memory (video RAM) adapted to store image information displayed on the display screen of the display device 30.

The drawing processing circuit 111 accepts drawing operations performed by the first indicator via the first sensor 20 and those performed by the second indicator via the second sensor 40, respectively via the position detection circuits 200 and 400, and generates drawing image information by referring to the parameters stored in an in-process parameter buffer memory, which is included of the work area RAM. The in-process parameter buffer memory stores various parameters that are specified as will be described later and used for rendering a drawing respectively in association with the first and second indicators.

Then, the drawing processing circuit 111 causes generated drawing image information to be displayed on the display screen of the display device 30 via the display control circuit 113. In this case, the drawing processing circuit 111 controls the display control circuit 113 to cause the drawing image to be displayed at the display screen positions matching the position coordinates of the drawing operations accepted via the position detection circuits 200 and 400.

Further, the drawing processing circuit 111 stores generated drawing information in the drawing image memory 102 in such a manner that the display screen positions match the position coordinates of the drawing operations. Still further, the drawing processing circuit 111 causes the parameters, which are stored in the in-process parameter buffer memory, to be stored in the drawing parameter memory 103 as the parameters at the time of rendering the drawing image in association with the drawing image information stored in the drawing image memory 102. It should be noted that if the drawing image information is in a bitmap format, the parameters used for rendering the drawing image on a bit-by-bit basis are stored in the drawing parameter memory 103.

The parameter setting image generation circuit 112 has a capability to generate a parameter setting image which will be described later and to cause this image to be displayed superimposed on the drawing image on the display screen of the display device 30 via the display control circuit 113. Examples of the parameters that can be specified include:

Pen thickness (Thickness)
Hue (Color)
Brightness (Brightness)
Pen tip type (Brush)
Drawing pattern (Hatching Pattern)
Roundness (Roundness)
Opacity (Opacity)
Density (Density)
Hardness (Hardness)
Scattering (Scattering)
Pen pressure (Pressure)
Saturation (Saturation)

The above parameters are illustrative, and the parameters that can be specified are not limited thereto.

The operation input detection circuit 114 monitors not only indication input operations made by the first and second indicators respectively via the first and second sensors 20 and 40 but also operation information from the button operation section 104. The operation input detection circuit 114 has a capability to determine whether a drawing operation has been performed, a capability to determine whether an operation input has been made to change parameter settings, and a capability to determine whether another operation input has been made, by analyzing operation information including each of indication input operations and gestures. Then, when a determination is made that an indication input operation is a drawing operation, the operation input detection circuit 114 supplies the drawing operation information to the drawing processing circuit 111. On the other hand, when a determination is made that an indication input operation or operation information is an operation made to change a parameter setting, the operation input detection circuit 114 supplies information about the parameter setting change operation to the parameter setting image generation circuit 112.

The drawing processing circuit 111 performs a drawing process in accordance with the drawing operation information from the operation input detection circuit 114. On the other hand, the parameter setting image generation circuit 112 performs a process appropriate for the information about the parameter setting change operation from the operation input detection circuit 114 as will be described later, thus performing a parameter changing process or a similar process.

Processing Operation Performed by the Drawing Device 10

A description will be given below of the operations performed by the drawing device 10 configured as described above when rendering a drawing and changing a drawing parameter.

Figure 5:
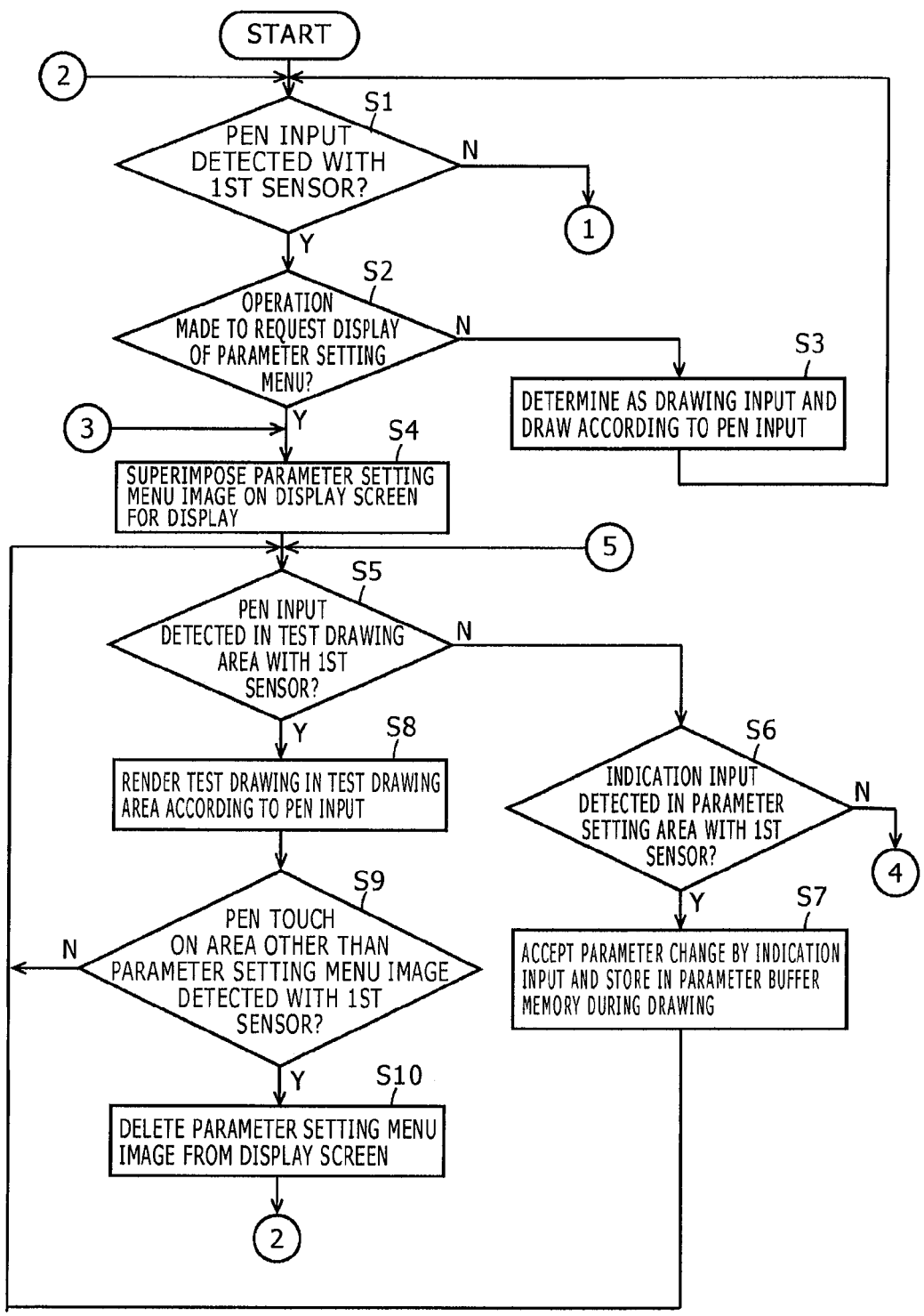
FIG. 5 illustrates part of a flowchart of a process performed by a control circuit of the drawing device shown in FIG. 1, according to an embodiment of the present disclosure.
Figure 6:
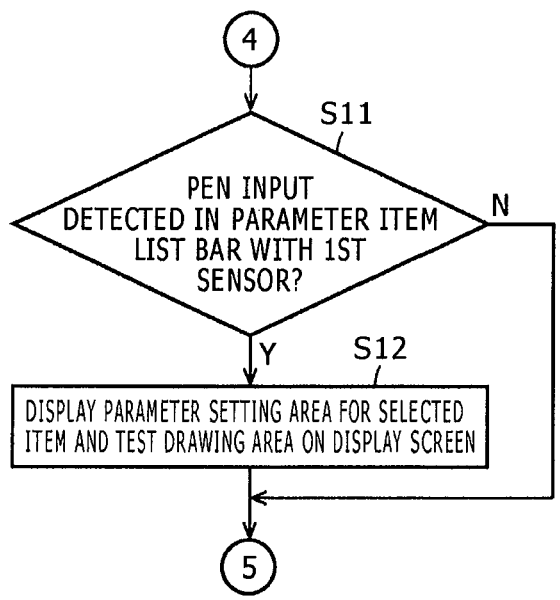
FIG. 6 illustrates part of the flowchart of the process performed by the control circuit of the drawing device shown in FIG. 1, according to an embodiment of the present disclosure.
Figure 7:
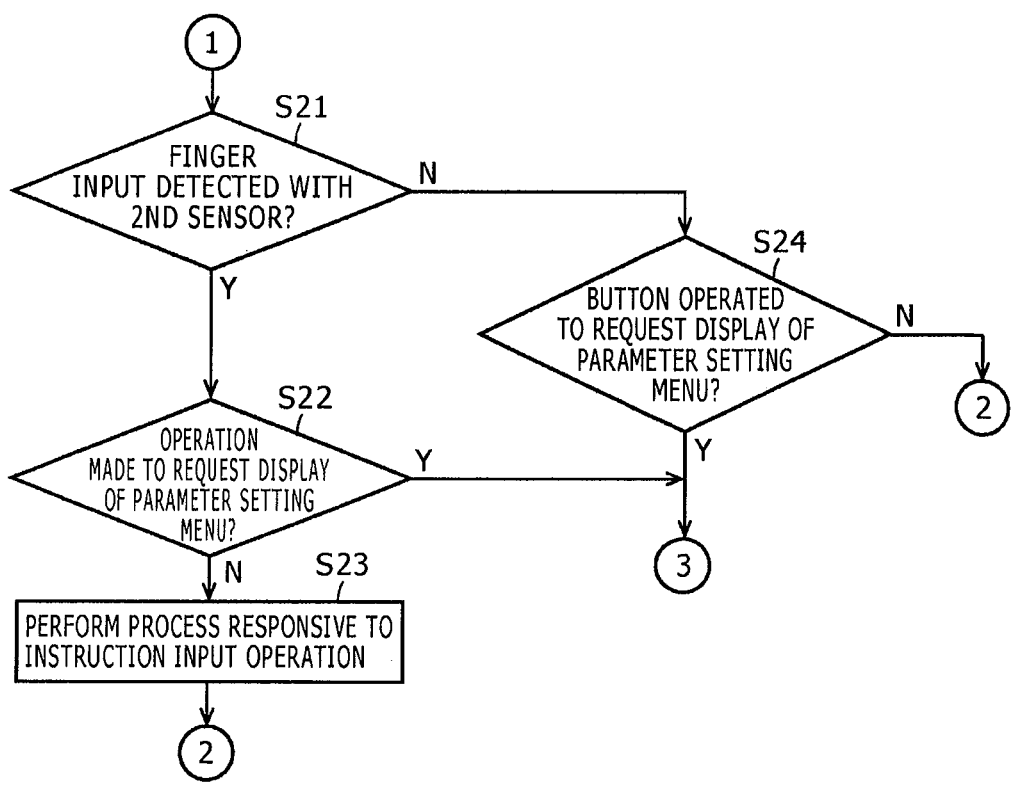
FIG. 7 illustrates part of the flowchart of the process performed by the control circuit of the drawing device shown in FIG. 1, according to an embodiment of the present disclosure.

FIG. 5, and FIGS. 6 and 7, which are continuations of FIG. 5, illustrate an example of a flowchart for the operations performed by the drawing device 10 when rendering a drawing and changing a drawing parameter. The steps shown in FIGS. 5 and 6 are handled by the circuits 111 to 114, which are the sections of the control circuit 101 having processing capabilities. For simplicity, however, a description will be given here assuming that the control circuit 101 handles the steps.

First, the control circuit 101 determines whether or not the first sensor 20 has detected an indication input by the electronic pen 23 by monitoring detection outputs of the indicators from the position detection circuit 200 (step S1). When a determination is made in step S1 that the first sensor 20 has detected an indication input by the electronic pen 23, the control circuit 101 determines whether or not the indication input by the electronic pen 23 is an operation for requesting the displaying of the parameter setting menu (step S2). It should be noted that a description will be given later in which of a plurality of indication inputs by the electronic pen 23 is an operation for requesting the displaying of the parameter setting menu.

If a determination is made in step S2 that the indication input by the electronic pen 23 is not an operation for requesting the displaying of the parameter setting menu, the control circuit 101 determines that the indication input by the electronic pen 23 is a drawing operation and performs the drawing process appropriate for the drawing operation (step S3). Then, the control circuit 101 returns the process to step S1 when this step S3 ends.

Figure 8:
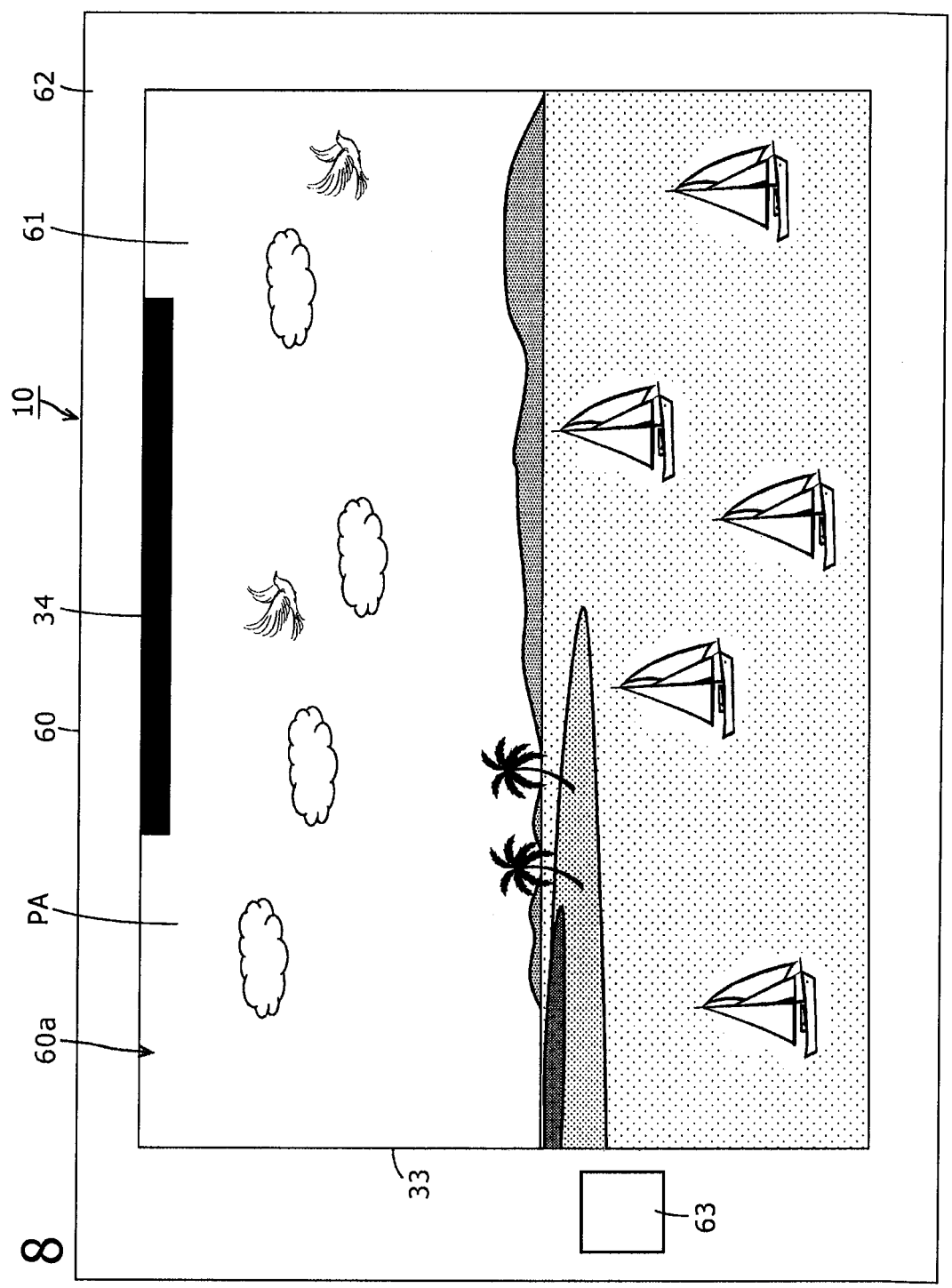
FIG. 8 illustrates an example of a display image generated in accordance with the process performed by the control circuit of the drawing device shown in FIG. 1, according to an embodiment of the present disclosure.

As steps S1 to S3 are repeated, a drawing image PA as shown, for example, in FIG. 8 is generated and displayed on the display screen 33 of the display device 30. Further, the drawing image information of the drawing image PA is stored in the drawing image memory 102, and the parameter settings at the time of rendering the drawing are stored in the drawing parameter memory 103 in association with the display screen positions of the drawing image (in units of a pixel dot).

Figure 9:
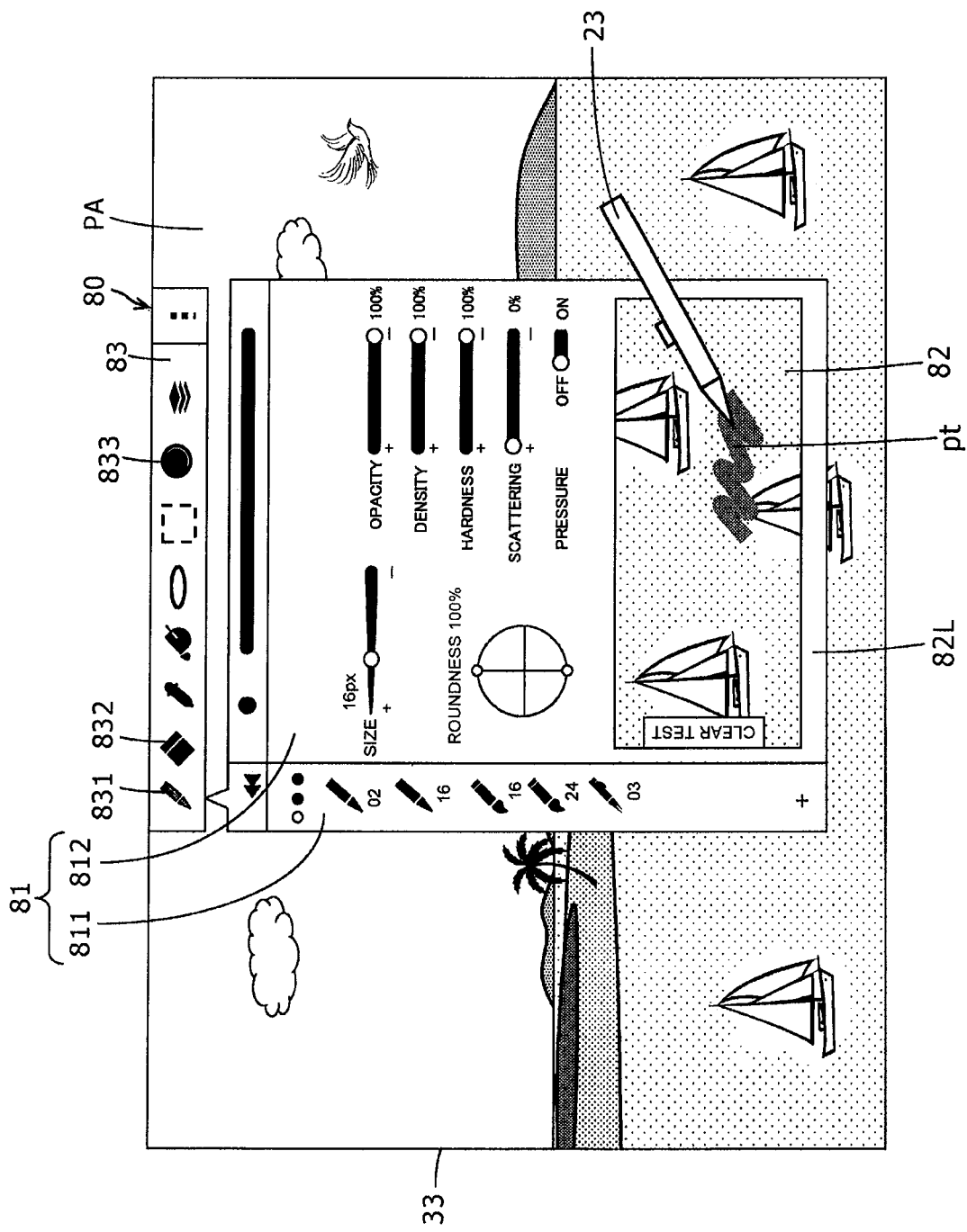
FIG. 9 illustrates an example of a display image generated in accordance with the process performed by the control circuit of the drawing device shown in FIG. 1, according to an embodiment of the present disclosure.

Then, when a determination is made in step S2 that the indication input by the electronic pen 23 is an operation for requesting the displaying of the parameter setting menu, the control circuit 101 generates an image of a parameter setting menu 80 and causes the image to be displayed superimposed on part of the drawing image PA as shown in FIG. 9 (step S4).

Here, the parameter setting menu 80 includes a parameter setting area 81, a test drawing area 82, and a parameter item list bar 83, as shown in FIG. 9. A parameter setting area 81 is used to accept changes to the parameter setting items. The parameter item list bar 83 includes a row of a plurality of items including a pen type 831, an eraser 832, a color setting 833, and the like. The parameter setting area 81 is displayed and is made available for a selected one of the plurality of items displayed in the parameter item list bar 83. In the example shown in FIG. 9, the parameter setting area 81 is displayed when the pen type 831, which is one of the parameter items in the parameter item list bar 83, is selected; the parameter setting area 81 is displayed superimposed on the drawing image PA.

The parameter setting area 81 includes a selectable setting column 811 and a detailed setting column 812. For the items of the pen type 831 of the example shown in FIG. 9, the selectable setting column 811 of the parameter setting area 81 has a pen tip shape (Brush) item and a pen thickness (Thickness) item as selectable items, and the detailed setting column 812 has an opacity (Opacity) item, a density (Density) item, a hardness (Hardness) item, a scattering (Scattering) item, and a pen pressure (Pressure) item as items that can be adjusted or turned on or off.

In the example shown in FIG. 9, the selectable setting column 811 enables switching to a desired pen tip shape and pen thickness by selecting a pen tip shape and pen thickness with the electronic pen 23. On the other hand, the detailed setting column 812 enables specifying of each parameter in detail by placing the tip of the electronic pen 23 on a corresponding one of the white round portions shown in FIG. 9 and sliding it.

The test drawing area 82 is displayed superimposed on the drawing image PA together with the parameter setting area 81. In this case, the test drawing area 82 is formed and displayed superimposed on the drawing image PA in such a manner that part of the drawing image PA which would normally be hidden because of the superimposed displaying of the test drawing area 82 is visually identifiable (i.e., visible) through the drawing area 82.

In the example shown in FIG. 9, the test drawing area 82 is formed in part of the lower portion of the rectangular parameter setting area 81 as a rectangular transparent window area in such a manner that the drawing image PA which would be hidden because of the superimposed displaying of the test drawing area 82 is visually identifiable. In this case, as shown in FIG. 9, the test drawing area 82 is displayed as a rectangular transparent window surrounded by an opaque frame 82L making up part of the parameter setting area 81. However, the boundaries of the test drawing area 82 are explicitly visually identifiable by the opaque frame 82L.

Then, when the user places the electronic pen 23 inside the test drawing area 82 as illustrated in FIG. 9 and performs a drawing operation, the drawing processing circuit 111 detects the drawing operation as a test drawing operation rather than a drawing operation on the drawing image PA. Then, the drawing processing circuit 111 writes image information of a test drawing image pt appropriate for the test drawing operation to the buffer memory and displays the test drawing image pt superimposed on the drawing image PA (refer to step S8 which will be described later). The test drawing image pt rendered by the drawing operation with the electronic pen 23 at this time is done so based on the parameters specified in the parameter setting area 81. Therefore, the user can verify whether the parameters specified in the parameter setting area 81 are suitable by directly comparing the drawing image PA appearing through the test drawing area 82 and the test drawing image pt.

Referring back to the description of the flowchart shown in FIG. 5, the control circuit 101 determines after step S4 whether or not the first sensor 20 has detected a drawing operation by the electronic pen 23 in an area falling within the test drawing area 82 (step S5).

On the other hand, if a determination is made in step S5 that the first sensor 20 has not detected a drawing operation by the electronic pen 23 in an area falling within the test drawing area 82, the control circuit 101 determines whether or not the first sensor 20 has detected an indication operation by the electronic pen in the parameter setting area 81 (step S6).

When a determination is made in step S6 that the first sensor 20 has detected an indication operation by the electronic pen in the parameter setting area 81, the control circuit 101 causes the parameters that have been changed by the indication operation by the electronic pen 23 to be stored in the in-process parameter buffer memory (step S7). Then, the control circuit 101 returns the process to step S5 after step S7 and repeats step S5 and subsequent steps.

On the other hand, if a determination is made in step S6 that the first sensor 20 has not detected an indication operation by the electronic pen in the parameter setting area 81, the control circuit 101 determines whether or not the first sensor 20 has detected an indication operation by the electronic pen 23 in an area falling within the parameter item list bar 83 (step S11 in FIG. 6).

If a determination is made in step S11 that the first sensor 20 has not detected an indication operation by the electronic pen 23 in an area falling within the parameter item list bar 83, the control circuit 101 returns the process to step S5 and repeats step 5 and subsequent steps.

On the other hand, when a determination is made in step S11 that the first sensor 20 has detected an indication operation by the electronic pen 23 in an area falling within the parameter item list bar 83, the control circuit 101 causes the parameter setting area 81 and the test drawing area 82 to be displayed on the display screen 33, wherein the parameter setting area 81 and the test drawing area 82 are made available for the items selected in the parameter item list bar 83 (step S12). Then, the control circuit 101 returns the process to step S5 and repeats step 5 and subsequent steps.

Figure 10:
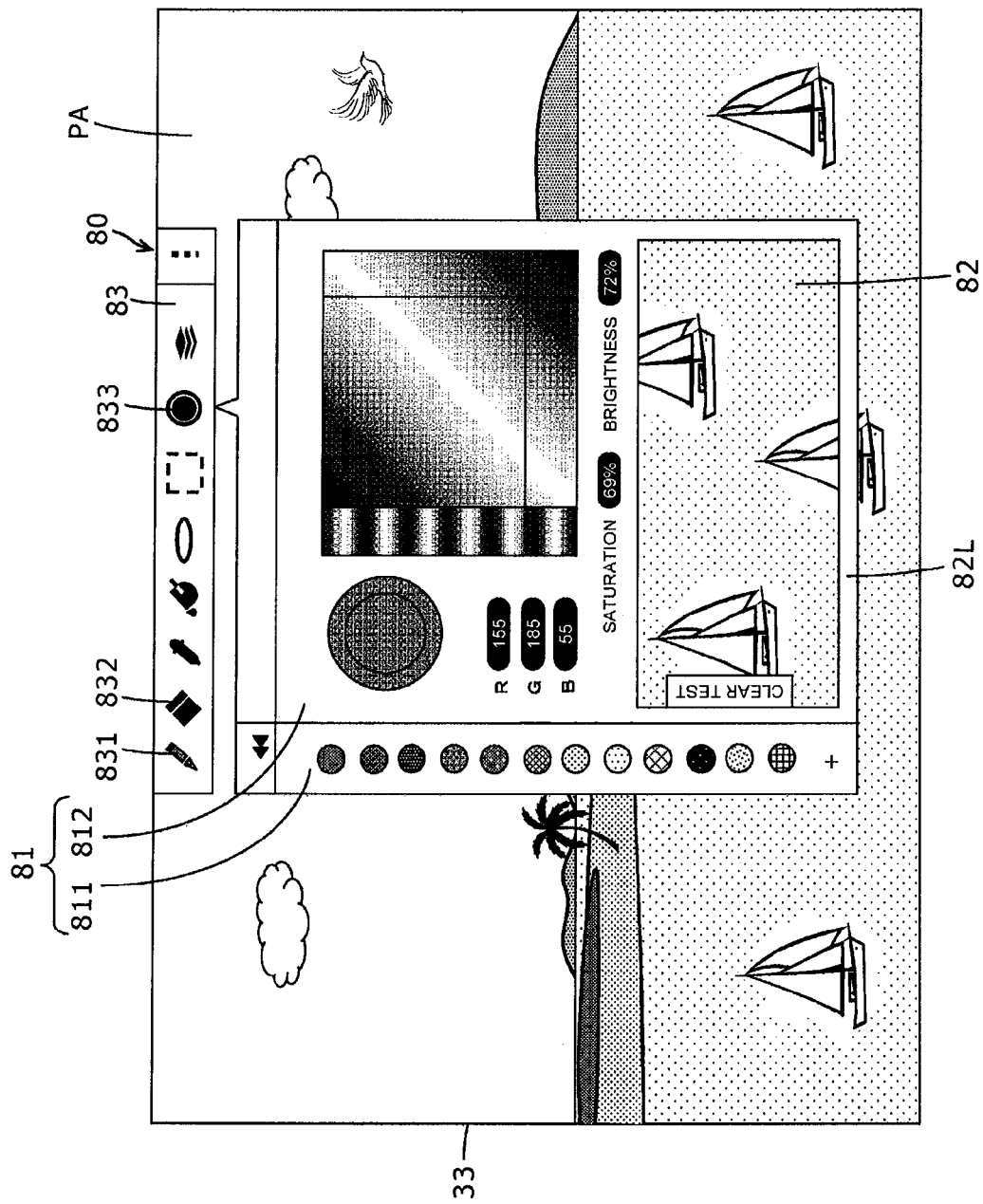
FIG. 10 illustrates an example of a display image generated in accordance with the process performed by the control circuit of the drawing device shown in FIG. 1, according to an embodiment of the present disclosure.

FIG. 10 illustrates an example of an image of the parameter setting menu 80 displayed when the color setting 833, which is one of the items in the parameter item list bar 83, is selected in steps S11 and S12. In the example shown in FIG. 10, a color can be selected in the selectable setting column 811 of the parameter setting area 81, and a saturation level (Saturation) and a brightness level (Brightness) of the selected color can be specified in detail in the detailed setting column 812.

In the example shown in FIG. 10, it is easy to determine whether the specified saturation and brightness levels are suitable for the color selected in the parameter setting area 81 by rendering a test drawing in the test drawing area 82 with the electronic pen 23 and comparing it against the drawing image PA. It should be noted that, in the example shown in FIG. 10, the contents of the image in the parameter setting area 81 are changed according to the items of the color setting 833.

When a determination is made in step S5 that the first sensor 20 has detected a drawing operation by the electronic pen 23 in an area falling within the test drawing area 82, the control circuit 101 causes a test drawing image rendered according to the drawing operation with the electronic pen 23 to be displayed superimposed on the drawing image PA in the test drawing area 82 (step S8). Parameter information stored in the in-process parameter buffer memory at this time is information about the parameter settings specified in the parameter setting area 81 in step S7. That is, an operation adapted to render a test drawing by the electronic pen 23 in the test drawing area 82 is conducted based on the newly specified parameters. Therefore, the user can verify whether or not the specified parameters are suitable by comparing the drawing image PA that can be viewed through the test drawing area 82 and the test drawing image displayed superimposed on the drawing image PA.

Next, the control circuit 101 determines whether or not a touch operation (or tap operation) has been made by the electronic pen 23 in an area other than where the image of the parameter setting menu 80 is displayed (step S9). If a determination is made in step S9 that a touch operation (or tap operation) has not been made by the electronic pen 23 in an area other than where the image of the parameter setting menu 80 is displayed, the control circuit 101 returns the process to step S5 and repeats step S5 and subsequent steps.

On the other hand, on the display screen 33, when a determination is made in step S9 that a touch operation (or tap operation) has been made by the electronic pen 23 in an area other than where the image of the parameter setting menu 80 is displayed, the control circuit 101 causes the image of the parameter setting menu 80, which is made up of the parameter setting area 81, the test drawing area 82, and the parameter item list bar 83, to be deleted from the display screen 33 of the display device 30, and brings the image display back to a state in which only the original drawing image PA is displayed (step S10). The control circuit 101 returns the process to step S1 after step S10 and repeats step S1 and subsequent steps.

That is, in the present embodiment, when the user makes a touch operation (or tap operation) on the display screen 33 with the electronic pen 23 in an area of the display screen 33 other than where the image of the parameter setting menu 80 is displayed, the operation input detection circuit 114 detects the touch operation (or tap operation) as an operation adapted to instruct the deletion of the image of the parameter setting menu 80, and the detection output thereof is supplied to the parameter setting image generation circuit 112. When the parameter setting image generation circuit 112 receives the detection output of the deletion instruction operation, it causes the image of the parameter setting menu 80 that is displayed superimposed on the drawing image PA to be deleted, and brings the image display back to a state in which only the original drawing image PA is displayed.

It should be noted that the information in the in-process parameter buffer memory is information about the parameter settings specified in the parameter setting menu 80 immediately prior to the deletion of the parameter setting menu 80. Therefore, the rendering of the drawing image PA from that time on is conducted based on the parameters specified in the parameter setting menu 80.

On the other hand, if a determination is made in step S1 that the first sensor 20 has not detected an indication input operation by the electronic pen 23, the control circuit 101 determines whether or not the second sensor 40 has detected an indication input operation by a finger (step S21 in FIG. 7). It should be noted that although the second sensor 40 can detect an indication input operation by an electrostatic pen as described above, a description will be given here for convenience of description assuming that fingers are the only indicators for the second sensor 40.

When a determination is made in step S21 that the second sensor 40 has detected an indication input operation by a finger, the control circuit 101 determines whether or not the detected indication input operation by the finger is an operation for requesting the displaying of the parameter setting menu (step S22). It should be noted that a description will be given later in which of a plurality of indication inputs is an operation for requesting the displaying of the parameter setting menu.

If a determination is made in step S22 that the indication input operation by the finger is not an operation for requesting the displaying of the parameter setting menu, the control circuit 101 performs a process appropriate for the indication input operation by the finger (step S23). Then, the control circuit 101 returns the process to step S1 when the step S23 ends.

Then, when a determination is made in step S23 that the indication input operation by the finger is an operation for requesting the displaying of the parameter setting menu, the control circuit 101 advances the process to step S4, generates the image of the parameter setting menu 80 causes this image to be displayed superimposed on part of the drawing image PA, and performs step S4 and subsequent steps described above.

On the other hand, if a determination is made in step S21 that the second sensor 40 has not detected an indication input operation by the finger, the control circuit 101 determines whether or not the pushbutton 63, which is a button used to request the display of the parameter setting menu, has been pressed (step S24).

When a determination is made in step S24 that the pushbutton 63 has been pressed, the control circuit 101 advances the process to step S4, generates the image of the parameter setting menu 80, causes this image to be displayed superimposed on part of the drawing image PA, and performs step S4 and subsequent steps described above. On the other hand, if a determination is made in step S24 that the pushbutton 63 has not been pressed, the control circuit 101 returns the process to step S1 and repeats step S1 and subsequent steps.

It should be noted that if, during the above process, the image of the parameter setting menu 80 is deleted in step S10, the image information of the test drawing rendered with the electronic pen 23 in the test drawing area 82 is deleted from a test drawing image buffer memory. However, when a test drawing reflection button or other button, which is displayed in the parameter setting area 81 of the parameter setting menu 80, is operated with the electronic pen 23 or a finger, image information of the test drawing may be reflected in the drawing image PA. In this case, the drawing image information temporarily stored in the test drawing image buffer memory is written to the drawing image memory 102.

Further, in the above process, when an area other than the image of the parameter setting menu 80 is touched or tapped on the display screen 33, the image of the parameter setting menu 80 is deleted, after which the parameter setting mode is exited. However, the operation to delete the image of the parameter setting menu 80 and exit the parameter setting mode is not limited thereto. For example, the image of the parameter setting menu 80 may be deleted and the parameter setting mode may be exited by touching or tapping an exit button, which is displayed in the image of the parameter setting menu 80, with the electronic pen 23 or a finger. Alternatively, if a specific gesture operation by a finger or the electronic pen 23 on the display screen 33 is detected by the position detection circuit 200 or 400, this gesture operation may serve as an operation instructing the exiting of the parameter setting mode.

Further, in the above flowchart, the parameters specified in the parameter setting menu 80 are reflected in subsequent drawing image processing. However, a setting parameter decide button may be displayed, for example, in the parameter setting area 81 of the parameter setting menu 80 so that the specified parameters are reflected in the subsequent drawing image processing only when the decide button is touched or tapped. Alternatively, when the image of the parameter setting menu 80 is deleted, a message may be displayed on the display screen 33 to inquire about whether or not to reflect the specified parameters in the subsequent drawing image processing so that whether or not the specified parameters are reflected in the subsequent drawing image processing is determined in accordance with the user's reply to the inquiry.

Example of Operation for Requesting the Displaying of the Parameter Setting Menu A description will be given below of examples of operations used to request the displaying of the parameter setting menu detected in steps S2 and S22.

First Example

Figure 11:
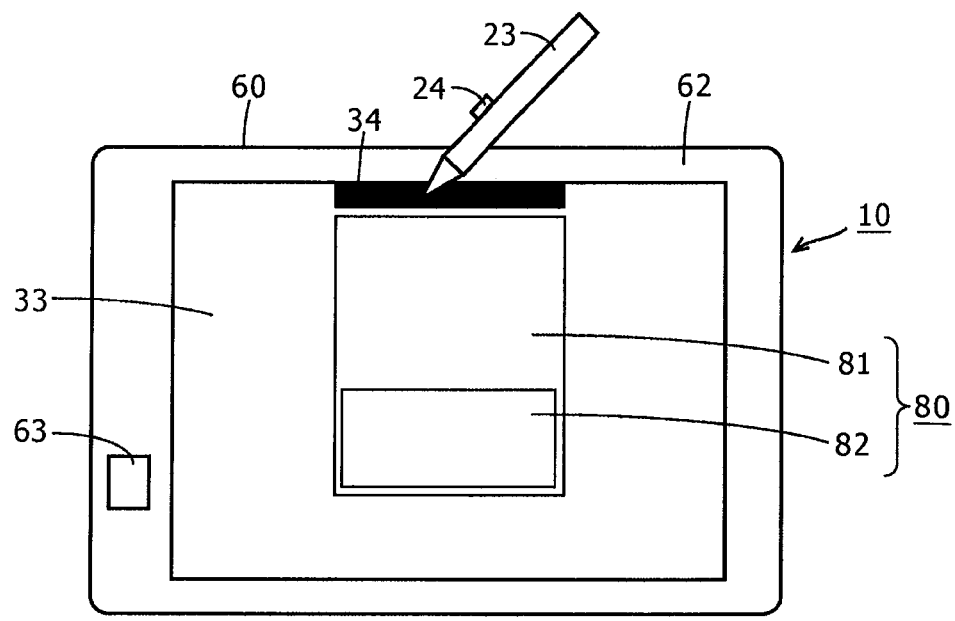
FIG. 11 illustrates an example of an operation for requesting the displaying of a parameter setting menu by the drawing device shown in FIG. 1, according to an embodiment of the present disclosure.

FIG. 11 illustrates a first example of an operation for requesting the displaying of the parameter setting menu. In this first example, an area 34 is provided to accept an operation for requesting the displaying of the parameter setting menu 80 at the center of the upper edge portion of the display screen 33 of the drawing device 10. Touching (or tapping) the area 34 with the electronic pen 23 or with a finger serves as an operation for requesting the displaying of the parameter setting menu 80. It should be noted that the parameter item list bar 83 of the parameter setting menu 80 is not shown in FIG. 11 for convenience of description. The same is true for the examples given below.

In this case, the electronic pen 23 is used primarily to make a drawing operation. For clear distinction from a drawing operation in this example, touching (or tapping) the area 34 with the electronic pen 23 while pressing and holding the side switch 24 in particular serves as the operation for requesting the displaying of the parameter setting menu. It should be noted that the operation input detection circuit 114 of the control circuit 101 detects the operation for requesting the displaying of the parameter setting menu by an indicator such as the electronic pen 23 or a finger by monitoring indicator detection outputs from the position detection circuits 200 and 400.

It should be noted that the area 34 appears in the form of a bar of a specific color as illustrated in FIGS. 11 and 8 for an explicit indication to the user. Additionally, text may be added to the area 34 in the form of the bar to indicate that the area 34 is used to request the displaying of the parameter setting menu.

It should be noted that the area 34 that is adapted to accept the operation for requesting the displaying of the parameter setting menu 80 is not limited to the center of the upper portion of the display screen 33 and may be provided at the left or right corner of the upper portion or at the left, right, or lower edge portion of the display screen 33.

Second Example

Figure 12:
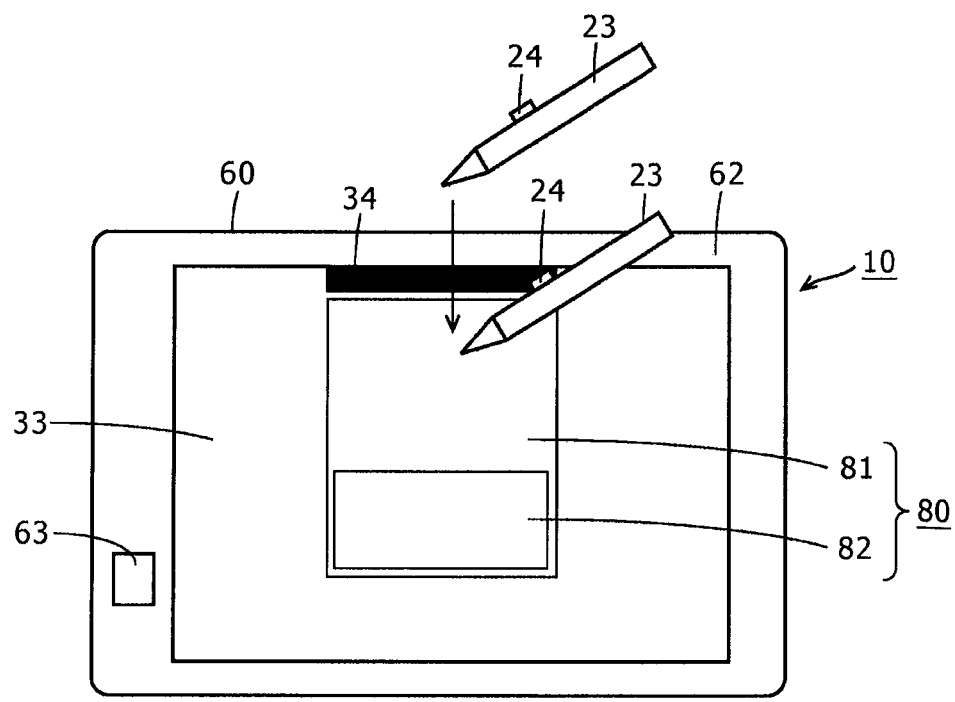
FIG. 12 illustrates an example of an operation for requesting the displaying of the parameter setting menu by the drawing device shown in FIG. 1, according to an embodiment of the present disclosure.
Figure 13:
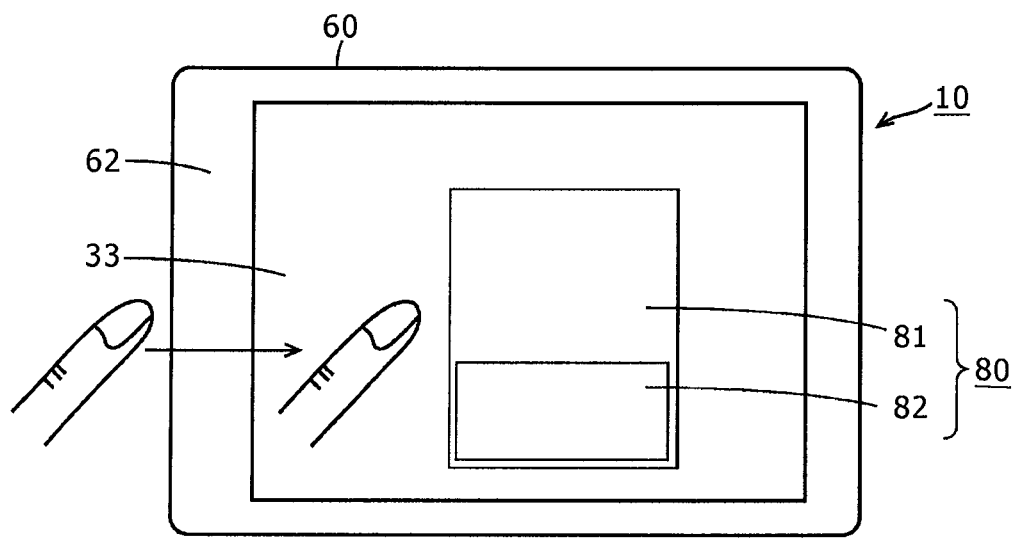
FIG. 13 illustrates an example of an operation for requesting the displaying of the parameter setting menu by the drawing device shown in FIG. 1, according to an embodiment of the present disclosure.

FIGS. 12 and 13 are diagrams used to describe a second example of an operation for requesting the displaying of the parameter setting menu. In the second example, as shown in FIG. 12, a gesture operation of the user moving the electronic pen 23 from top to bottom across the area 34 that is adapted to accept the operation for requesting the displaying of the parameter setting menu 80 serves as an operation for requesting the displaying of the parameter setting menu 80. Also in this example, the user makes a gesture operation of moving the electronic pen 23 from top to bottom while pressing and holding the side switch 24 for explicit distinction from a drawing operation.

Further, a gesture operation of the user moving a finger from top to bottom across the area 34 adapted to accept an operation for requesting the displaying of the parameter setting menu 80 similarly serves as an operation for requesting the displaying of the parameter setting menu 80.

In the second example, the operation input detection circuit 114 of the control circuit 101 detects such a gesture serving as an operation for requesting the displaying of the parameter setting menu by monitoring indicator detection outputs from the position detection circuits 200 and 400.

It should be noted that a gesture serving as an operation for requesting the displaying of the parameter setting menu is not limited to a gesture operation of moving the electronic pen or finger across the area 34 from top to bottom, and may be a gesture of moving the electronic pen or finger across the area 34 from bottom to top. Alternatively, if the area 34 is provided at the left or right edge portion of the display screen 33, a gesture operation of moving the electronic pen or finger across the area 34 from left to right or vice versa serves as a gesture operation for requesting the displaying of the parameter setting menu.

It should be noted that a gesture operation of simply moving a finger from an edge area 62 outside the display area of the display screen 33 to inside the display area or, conversely, a gesture operation of moving a finger from inside the display area of the display screen 33 to the edge area 62, both without providing the area 34, may serve as a gesture operation for requesting the displaying of the parameter setting menu, as shown in FIG. 13. It should be noted that although a gesture operation by a finger is shown in FIG. 13, a gesture operation by the electronic pen 23 rather than a finger is also applicable.

Third Example

Figure 14:
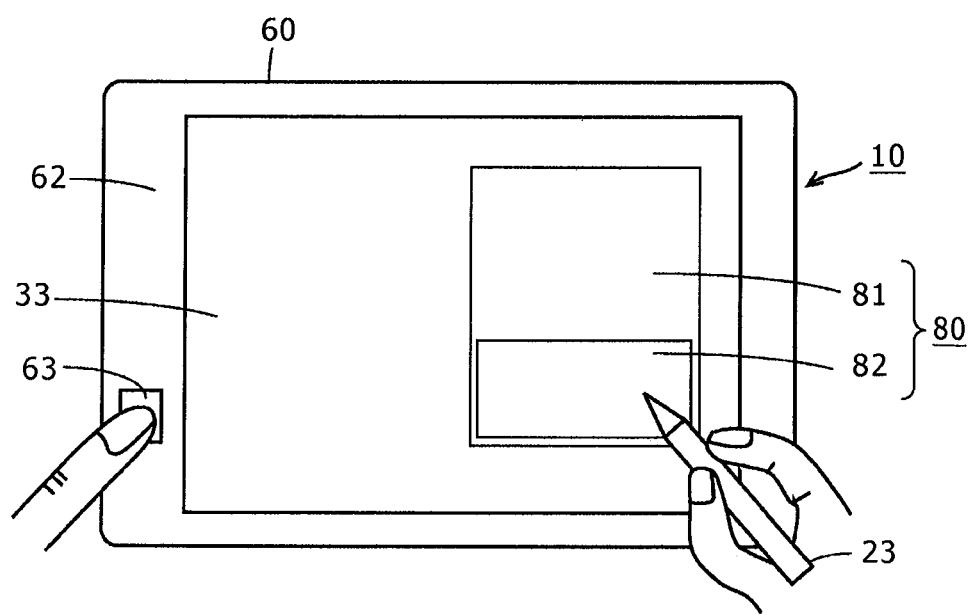
FIG. 14 illustrates an example of an operation for requesting the displaying of the parameter setting menu by the drawing device shown in FIG. 1, according to an embodiment of the present invention.

FIG. 14 is a diagram for describing a third example of an operation for requesting the displaying of the parameter setting menu. In the third example, pressing only the pushbutton 63 does not serve as an operation for requesting the displaying of the parameter setting menu. Instead, in the third example, an operation of touching or tapping an arbitrary position of the display screen 33 by the electronic pen 23 while pressing and holding the pushbutton 63 serves as an operation for requesting the displaying of the parameter setting menu.

In the case of the third example, a touch operation (or tap operation) accompanied by pressing of the pushbutton 63 serves as an operation for requesting the displaying of the parameter setting menu.

Then, in the case of the third example in particular, the image of the parameter setting menu 80 is displayed superimposed on the drawing image PA on the display screen 33 in such a manner that the position touched or tapped by the electronic pen 23 is included in the test drawing area 82 through which the drawing image PA appears as illustrated in FIG. 14.

Further, in the case of the third example, on the drawing image PA, drawing image information of the position touched or tapped by the electronic pen 23 is acquired, the acquired drawing image information as the specified parameters is displayed in the parameter setting menu 80, and the drawing image information in the drawing parameter memory 103 is stored as the parameter settings.

Figure 15:
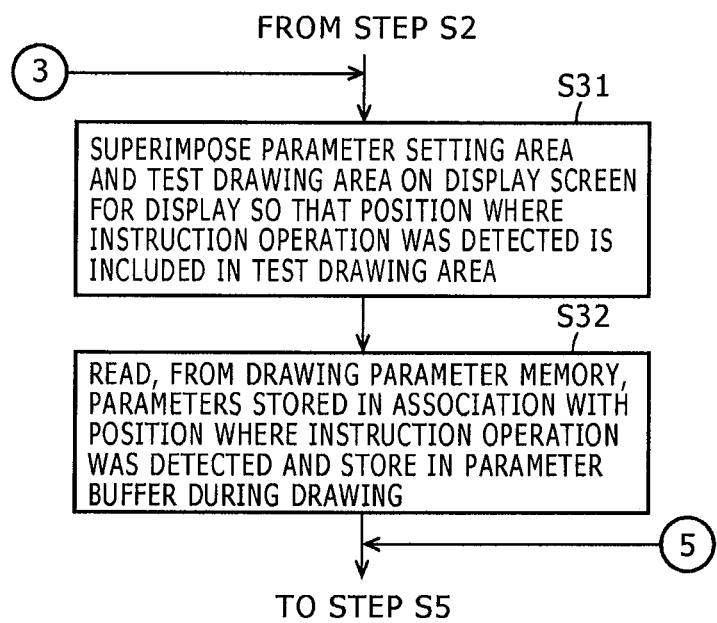
FIG. 15 illustrates part of a flowchart of a process performed by the control circuit of the drawing device shown in FIG. 1, according to an embodiment of the present disclosure.
Figure 16:
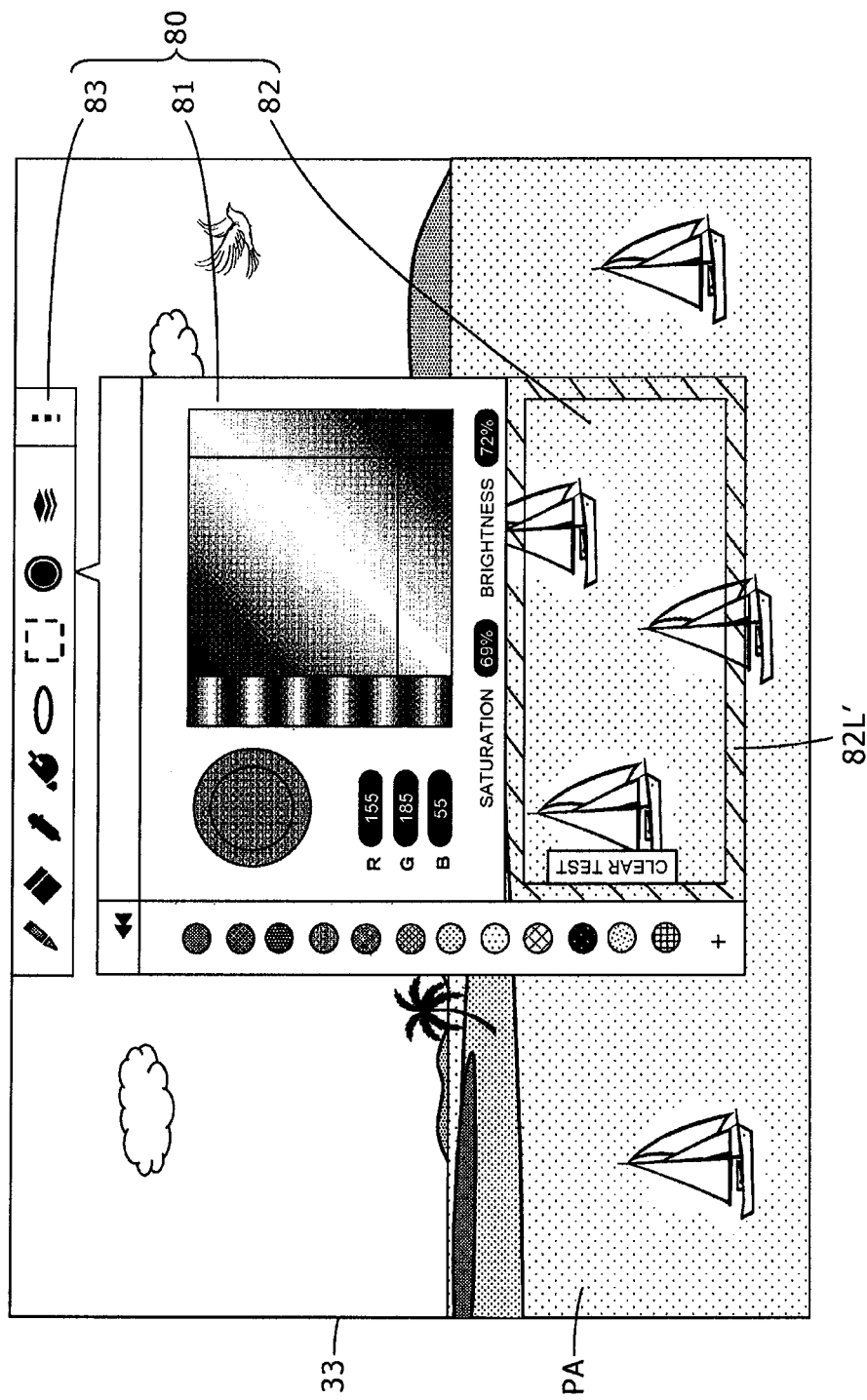
FIG. 16 illustrates an example of a display image generated in accordance with the process performed by the control circuit of the drawing device shown in FIG. 1, according to an embodiment of the present disclosure.

In the case of the third example, two steps shown in FIG. 15 are performed rather than step S4 in the flowchart of FIG. 5.

That is, in the third example, when a determination is made in step S2 of FIG. 5 that an indication input operation by the electronic pen 23 is an operation for requesting the displaying of the parameter setting menu, the control circuit 101 causes the parameter setting area 81, the test drawing area 82, and the parameter item list bar 83 to be displayed superimposed on the drawing image PA in such a manner that the position touched or tapped by the electronic pen 23 is included in the test drawing area 82 (step S31 in FIG. 15).

Next, the control circuit 101 reads, from the drawing parameter memory 103, the parameter settings stored in association with the drawing image information of the position of the drawing image PA touched or tapped by the electronic pen 23, causes the parameter setting area 81 to be displayed with the read parameter settings specified as the parameters in the parameter setting area 81, and causes the read parameter settings to be stored in the in-process parameter buffer memory (step S32). After step S32, the control circuit 101 performs step S5 and subsequent steps in FIG. 5.

In the case of the third example, as the user (drawer) touches or taps with the electronic pen 23 a portion of the drawing image PA to which he or she wishes to make an addition or change while pressing and holding the pushbutton 63, the control circuit 101 determines that the touching or tapping operation is an operation for instructing the acquisition of drawing image information of the touched or tapped portion of the drawing image PA, causes the touched or tapped portion of the drawing image PA to be displayed through the test drawing area 82, and acquires the drawing image information of the portion of the drawing image PA. This is an extremely convenient feature.

Other Examples of Operation

Examples of operations for requesting the displaying of the parameter setting menu are not limited to the first to third examples described above. For example, an operation of double-touching (double-tapping) an arbitrary position of the drawing image PA displayed on the display screen 33 by the electronic pen 23 or by a finger while pressing and holding the side switch 24 may serve as an operation for requesting the displaying of the parameter setting menu. In that case, the double-touched or double-tapped position may be included in the test drawing area 82, and the parameter settings may be changed based on the parameters stored in association with the double-touched or double-tapped position of the drawing image PA, as in the third example.

Further, a gesture operation may be a specific one rather than a vertical or horizontal linear operation such as moving the electronic pen 23 down and then diagonally up to the right as when drawing, for example, a "tick mark" while pressing and holding the side switch 24 or a similar operation with a finger may serve as an operation for requesting the displaying of the parameter setting menu.

Gesture operations by the electronic pen or finger may be registered in the drawing device 10 as operations for requesting the displaying of the parameter setting menu so that when the operation input detection circuit 114 detects one of the registered gesture operations, a determination is made that an operation for requesting the displaying of the parameter setting menu has been performed. In that case, gesture operations to be registered may be selected from among a plurality of gesture operation patterns made available in advance. Alternatively, the user may perform unique gesture operations by the electronic pen or finger and register these operations in the drawing device.

As described above, in the drawing device according to the present embodiment, a portion of a drawing in the image display area of the display appears through the test drawing area. As a result, when a test drawing is rendered in the test drawing area, the drawing information according to the parameters at the time of rendering the test drawing is displayed superimposed on a drawing by the display process. This makes it possible to compare the test drawing information and the drawing being displayed in the test drawing area, thus allowing desired parameters to be specified with ease.

Moreover, a test drawing area that permits a drawing operation with an indicator and a parameter setting area where the parameters for drawing information generated by a drawing operation by an indicator conducted in the test drawing area are changed are displayed superimposed on a drawing in the image display area of the display in response to a detection of a given indication operation by a sensor, thus providing the parameter setting area of a necessary size without inhibiting the rendering of a drawing in the image display area of the display.

Further, the superimposed displaying of the test drawing area and the parameter setting screen on the drawing in the image display area of the display device permits easy visual identification of the fact that parameters for rendering the drawing can be specified using an indicator.

Still further, because the test drawing area is displayed in a visually identifiable manner in the image display area of the display device, the boundaries of the drawing in the image display area of the display device to be compared to the drawing information in the test drawing area generated using the indicator are explicitly specified, thus making it possible to compare drawing information at the time of rendering a test drawing and a drawing being displayed with ease.

Other Embodiments and Modification Examples

In the above description, the test drawing area 82 is surrounded by an opaque frame in the parameter setting menu 80 so that the bounds of the test drawing area 82 are visually identifiable by the user. However, the display process enabling the bounds of the test drawing area 82 to be visually identifiable by the user is not limited to surrounding the test drawing area 82 with an opaque frame.

For example, a frame-like portion 82L' having a given width provided around the test drawing area 82 may be displayed less transparently than the portion of the test drawing area 82 through which a portion of the drawing image PA appears so that the user can visually identify the bounds of the test drawing area 82. In this case, the frame-like portion 82L' having the given width provided around the test drawing area 82 is displayed superimposed on the drawing image PA with a given level of transparency such as translucently so that the portion of the drawing image PA is visible through the frame-like portion 82L'.

In the display screen 33, the image of the parameter setting menu 80 that is displayed superimposed on the drawing image PA may be moved by dragging it with a finger or the electronic pen 23. Further, the drawing image PA may be moved rather than moving the image of the parameter setting menu 80.

Figure 17:
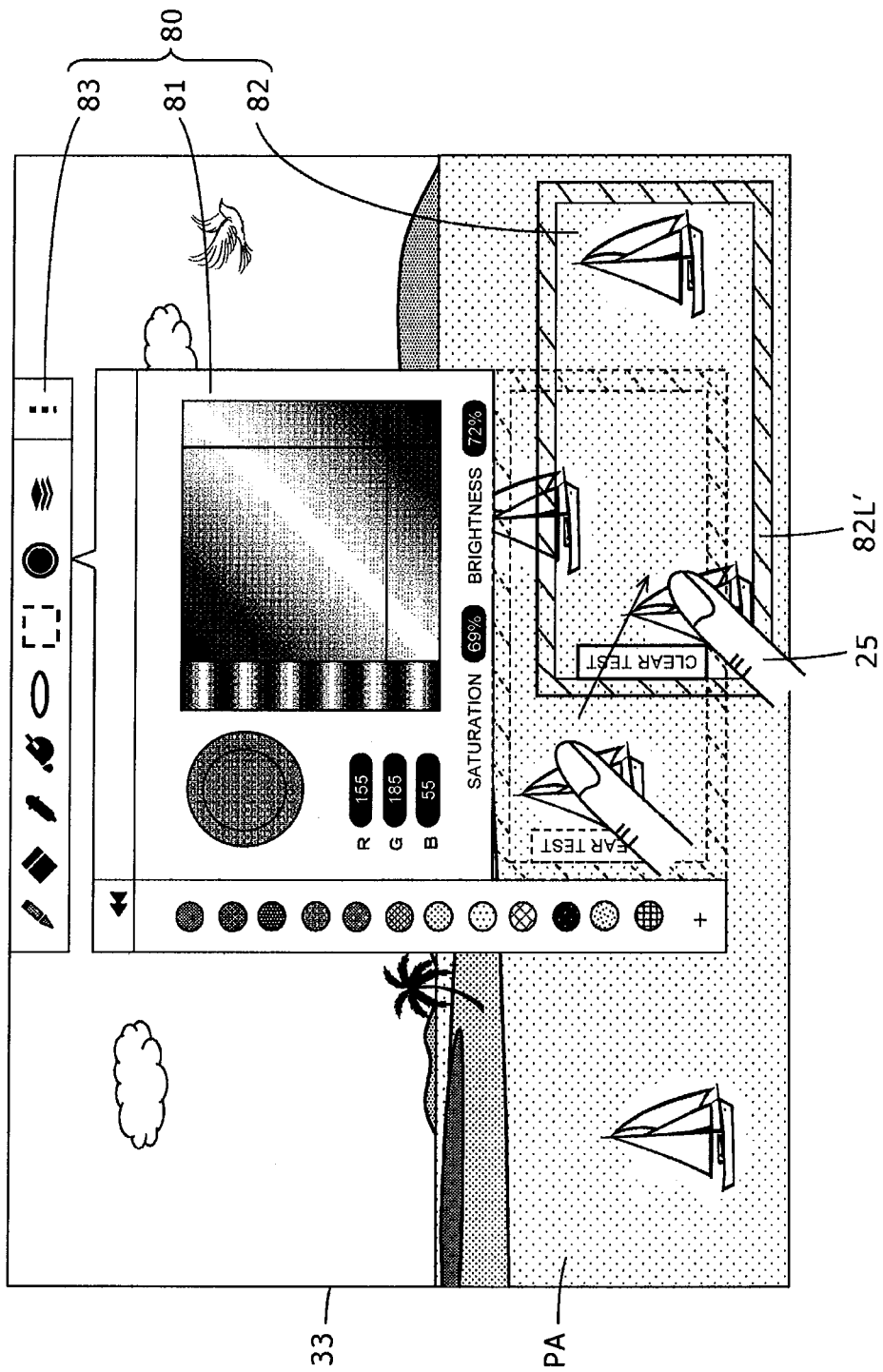
FIG. 17 illustrates an example of a display image generated in accordance with the process performed by the control circuit of the drawing device shown in FIG. 1, according to an embodiment of the present disclosure.

Still further, the test drawing area 82 may be separated from the image of the parameter setting menu 80 and moved. FIG. 17 illustrates an example for describing the separation and movement of the test drawing area 82. The example of FIG. 17 shows that the test drawing area 82 has been separated from the parameter setting menu 80 and moved to a desired position on the drawing image PA by touching and dragging an arbitrary position of the test drawing area 82 with a finger 25 and moving the test drawing area 82 while at the same time touching and dragging it.

It should be noted that the test drawing area 82 that has been separated and moved can be reattached to the parameter setting menu 80. In that case, the test drawing area 82 can be reattached to the parameter setting menu 80 with ease by taking the following steps. That is, the user touches and drags an arbitrary position of the test drawing area 82 and moves the test drawing area 82 close to its original position in the parameter setting menu 80 while at the same time touching and dragging it. As a result, the parameter setting image generation circuit 112 generates the original image of the parameter setting menu 80 with the test drawing area 82 attached to the parameter setting area 81, displaying this original image. That is, when a detection is made that the test drawing area 82 has moved close to its original position in the parameter setting menu 80, the parameter setting image generation circuit 112 generates the original image of the parameter setting menu 80, and causes this original image to be displayed.

As a result, when the user moves the test drawing area 82 close to its original position in the parameter setting menu 80, the test drawing area 82 is displayed attached and combined with the parameter setting area 81 so that the test drawing area 82 is quickly pulled to its original position in the parameter setting menu 80. This makes it possible for the user to restore the test drawing area 82 to its original state in which the test drawing area 82 is combined with the parameter setting menu 80.

As described above, at least the test drawing area 82 can be moved to a desired location of the drawing image PA where an addition or change is to be made to the drawing. This feature is extremely convenient because it enables the parameter settings of the drawing to be changed where the user wishes to make an addition or change to the drawing while at the same time comparing with the original drawing image PA for reference.

It should be noted that, in the description given above, it is necessary to detect, with the first sensor 20 or second sensor 40, an indicator including a gesture operation stretching from the edge area 62 to inside the display screen 33 in the area of the display screen 33 when detecting an operation for requesting the displaying of the parameter setting menu.

Figure 18:
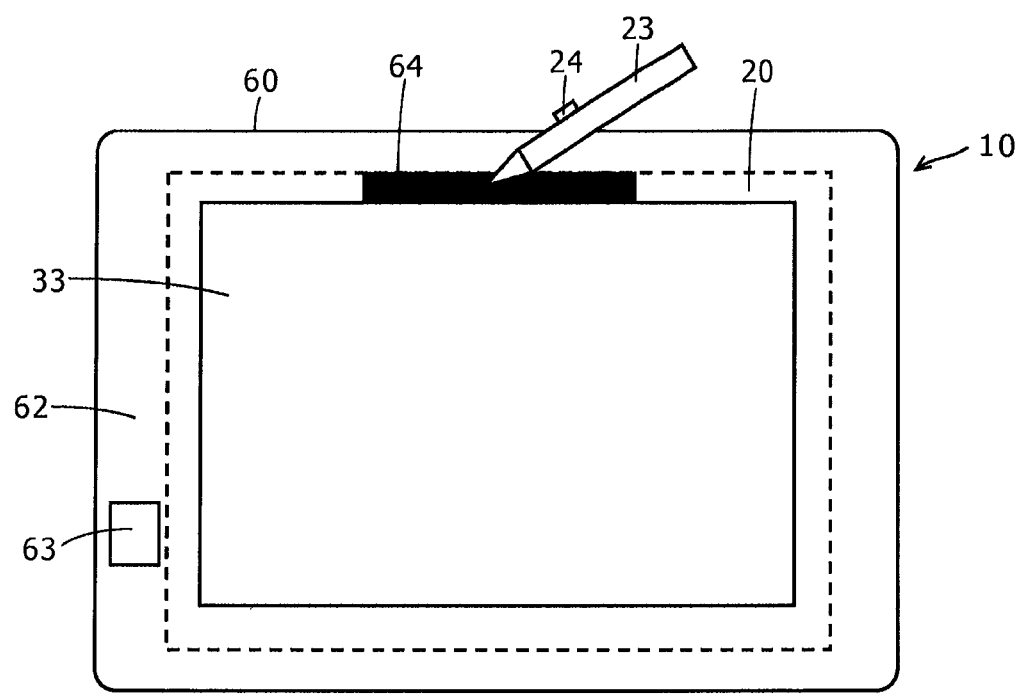
FIG. 18 illustrates an example of an operation for requesting the displaying of the parameter setting menu by the drawing device shown in FIG. 1, according to an embodiment of the present disclosure.

However, the first sensor 20 or second sensor 40 may have an indicator detection area larger than the display screen 33 of the display device 30 as shown by a dotted line in FIG. 18. Therefore, an area 64, which is an indicator detection area of the first sensor 20 or second sensor 40 and part of the frame area 62 outside the display screen 33 of the display device 30 in the drawing device 10, may be used as a detection area for an operation for requesting the displaying of the parameter setting menu.

In the example shown in FIG. 18, an operation for requesting the displaying of the parameter setting menu can be detected not only in the area of the display screen 33 of the display device 30 but also in the frame area 62 outside the display screen 33 of the display device 30 with the first sensor 20 or second sensor 40. Such an operation can also be identified in the area 64, which is part of the frame area 62. In order to explicitly inform the user, the area 64 may be displayed filled with a specific color. Therefore, touching or tapping of the area 64 by the user with the electronic pen 23 can serve as an operation for requesting the displaying of the parameter setting menu. The same is true for a similar operation with a finger for the second sensor 40.

It should be noted that the drawing device 10 in the above embodiment has the first and second sensors 20 and 40 arranged respectively on the rear and front sides of the display device 30 thereby sandwiching the display device 30. However, both the first and second sensors 20 and 40 may be arranged on the front side (the side of the display screen 33) of the display device 30.

If the display device 30 includes an LCD (liquid crystal display) adapted to control the display using electrodes arranged in a grid form, the capacitance type position detection sensor serving as the second sensor 40 may be incorporated in the electrodes arranged in the grid form.

It should be noted that although, in the drawing device according to the above embodiments, an electromagnetic coupling type of position detection sensor is used as a first sensor, and a capacitance type of position detection sensor as a second sensor, it is apparent that the combination of the first and second sensors is not limited thereto. Further, although two sensors, namely, the first and second sensors, are used in the drawing device according to the above embodiments, a plurality of types of position detection techniques may be implemented by a single sensor.

It should be noted that although, in the above embodiments, the drawing image PA is generated by rendering a drawing drawn with the drawing device 10, the present technology is also applicable when an existing image or photograph is loaded into the drawing device 10 for use as the drawing image PA, and an image is rendered on top of the drawing image PA.

DESCRIPTION OF REFERENCE NUMERALS

10 Drawing device
20 First sensor
30 Display device
40 Second sensor
50 Control circuit board
60 Flat member
101 Control circuit
102 Drawing image memory
103 Drawing parameter memory
111 Drawing processing circuit
112 Parameter setting image generation circuit
113 Display control circuit
114 Operation input detection circuit
200 Position detection circuit for the first sensor
400 Position detection circuit for the second sensor

The invention claimed is:

1. A drawing device comprising:
a display device having an image display area;
a sensor arranged in a superimposed relationship with the image display area of the display device and having an indicator operation detection area sized so as to detect indicator operations in the image display area of the display device;
a memory adapted to store drawing information drawn by a user using an indicator on the display device; and
a control circuit that renders a drawing in the image display area of the display device based on the drawing information stored in the memory, and
the control circuit causing a test drawing area and a parameter setting area to be simultaneously displayed superimposed on the drawing in the image display area of the display device in response to a detection, by the sensor, of an indication operation by the user using the indicator, the test drawing area enabling a drawing operation by the user using the indicator in an area falling within the test drawing area and a test drawing image rendered in the test drawing area as a result of the user using the indicator in the test drawing area, the parameter setting area enabling changing of parameters of drawing information generated by the drawing operation in the test drawing area by the user using the indicator, the control circuit causing the test drawing area to be displayed in a visually identifiable manner in the image display area of the display device and causing the test drawing area to be displayed transparently with a portion of the drawing in the image display area of the display device appearing through the test drawing area, wherein the parameter setting area and the test drawing area that are simultaneously displayed superimposed on the drawing in the image display area of the display device are separable from or combinable with each other under control of the control circuit in response to an operation of the indicator.

2. The drawing device of claim 1, wherein
a peripheral portion of the test drawing area is controlled by the control circuit to be less transparent than at least one other portion of the test drawing area such that the at least one other portion of the test drawing area is displayed superimposed on the drawing in the image display area of the display device in a transparent and visually identifiable manner.

3. The drawing device of claim 2, wherein
the peripheral portion of the test drawing area is frame shaped and is controlled by the control circuit to be less transparent than the at least one other portion of the test drawing area such that the at least one other portion of the test drawing area is displayed superimposed on the drawing in the image display area of the display device in a transparent and visually identifiable manner.

4. The drawing device of claim 1, wherein
the drawing information is displayed superimposed on the drawing in the image display area of the display device generated by the drawing operation using the indicator in the test drawing area, and is controlled by the control circuit in such a manner that changes to parameters in the parameter setting area are reflected in the drawing.

5. The drawing device of claim 4, wherein
at least one of a line thickness, a hue, and a brightness parameter is changeable in the parameter setting area.

6. The drawing device of claim 1, wherein
the drawing information is acquired, under control of the control circuit, for a position of the drawing in the image display area of the display device displayed through the test drawing area indicated by the indicator, and wherein
the parameters are specified in the parameter setting area based on the acquired drawing information.

7. The drawing device of claim 1, wherein
the sensor detects a position indicated to the sensor by the indicator by being electromagnetically coupled to the indicator and the position is indicated in a frame area surrounding the image display area of the display device by the indicator, and wherein
the control circuit causes the parameter setting area and the test drawing area to be displayed superimposed on the drawing in the image display area of the display device when the position indicated by the indicator is in the frame area.

8. The drawing device of claim 1, wherein
the sensor detects a position indicated to the sensor by the indicator by being electromagnetically coupled to the indicator, in conjunction with a switch provided on the indicator, and wherein
the control circuit causes the parameter setting area and the test drawing area to be displayed superimposed on the drawing in the image display area of the display device in response to an operation made in the image display area of the display while at the same time the switch provided on the indicator is operated.

9. The drawing device of claim 1, wherein
the sensor detects a position indicated to the sensor by the indicator by being electromagnetically coupled to the indicator, in conjunction with an operation button provided on the display, and wherein
the control circuit causes the parameter setting area and the test drawing area to be displayed superimposed on the drawing in the image display area of the display device in response to an operation made in the image display area of the display device using the indicator while at the same time the operation button provided on the display is operated.

10. The drawing device of claim 1, wherein
the sensor detects a position indicated to the sensor by the indicator as a change in capacitance, in conjunction with a switch provided on the indicator, and wherein
the control circuit causes the parameter setting area and the test drawing area to be displayed superimposed on the drawing in the image display area of the display device in response to an operation made in the image display area of the display device while at the same time the switch provided on the indicator is operated.

11. The drawing device of claim 1, wherein
the sensor detects a position indicated on the sensor by the indicator as a change in capacitance, in conjunction with an operation button provided on the display, and wherein
the control circuit causes the parameter setting area and the test drawing area to be displayed superimposed on the drawing in the image display area of the display device in response to an operation made in the image display area of the display device using the indicator while at the same time the operation button provided on the display is operated.

12. The drawing device of claim 1, wherein
the indictor has first and second indicators, wherein
the sensor includes:
a first sensor that detects a position indicated by the first indicator; and
a second sensor that detects a position indicated by the second indicator using a type of position detection different from a type of position detection of the first sensor, and wherein
the drawing operation is performed using the first indicator, and the indication operation is performed using the second indicator.

13. The drawing device of claim 12, wherein
the first sensor detects a position indicated to the first sensor by the first indicator by being electromagnetically coupled to the first indicator, and wherein
the second sensor detects a position indicated to the second sensor by the second indicator as a detected change in capacitance.

14. The drawing device of claim 12, wherein
the first indicator is pen-shaped, and wherein
the second indicator is at least one of a pen-shaped indicator and a finger.

15. The drawing device of claim 12, wherein
the test drawing area that is displayed superimposed on the drawing in the image display area of the display device is movable in the image display area of the display device under control of the control circuit in response to an operation of the first indicator or the second indicator.

16. A drawing device comprising:

a display device having an image display area;

a sensor arranged in a superimposed relationship with the image display area of the display device and having an indicator operation detection area sized so as to detect indicator operations in the image display area of the display device;

a memory adapted to store drawing information drawn by a user using an indicator on the display device; and a control circuit that renders a drawing in the image display area of the display device based on the drawing information stored in the memory, and the control circuit causing a test drawing area and a parameter setting area to be simultaneously displayed superimposed on the drawing in the image display area of the display device in response to a detection, by the sensor, of an indication operation by the user using the indicator, the test drawing area enabling a drawing operation by the user using the indicator in an area falling within the test drawing area and a test drawing image rendered in the test drawing area as a result of the user using the indicator in the test drawing area, the parameter setting area enabling changing of parameters of drawing information generated by the drawing operation in the test drawing area by the user using the indicator, the control circuit causing the test drawing area to be displayed in a visually identifiable manner in the image display area of the display device and causing the test drawing area to be displayed transparently with a portion of the drawing in the image display area of the display device appearing through the test drawing area, wherein, when the parameter setting area and the test drawing area are simultaneously displayed superimposed on the drawing in the image display area of the display device and are separated from each other, and if, as a result of an operation of the indicator, a distance between the parameter setting area and the test drawing area, separated from the parameter setting area, becomes smaller than a predetermined value, the test drawing area moves, under control of the control circuit, such that the test drawing area is combined with the parameter setting area.

17. The drawing device of claim 1, wherein the control circuit causes the test drawing area to be displayed superimposed on the drawing in the image display area of the display device in response to the detection, by the sensor, of the indication operation by the indicator in the image display area of the display device such that a position where the indication operation was detected is included in the test drawing area.

18. A non-transitory computer-readable storage medium storing a computer program product for a drawing device, the drawing device including:

a display device having an image display area, a sensor arranged in a superimposed relationship with the image display area of the display device and having an indicator operation detection area sized to detect indictor operations in the image display area of the display device, and a memory that stores drawing information drawn by a user using an indicator on the display device;

the computer program product causing:

the drawing device to render a drawing in the image display area of the display device based on the drawing information stored in the memory;

the drawing device to simultaneously display a test drawing area and a parameter setting area superimposed on the drawing in the image display area of the display device in response to a detection, by the sensor, of an indication operation by the user using the indicator; the test drawing area enabling a drawing operation by the user using the indicator in an area falling within the test drawing area and a test drawing image rendered in the test drawing area as a result of the user using the indicator in the test drawing area, the parameter setting area enabling changes to parameters of the drawing information generated by the drawing operation in the test drawing area using the indicator; and the drawing device to display the test drawing area in a visually identifiable manner in the image display area of the display device and displaying the test drawing area transparently with a portion of the drawing in the image display area of the display device appearing through the test drawing area, wherein the parameter setting area and the test drawing area that are simultaneously displayed superimposed on the drawing in the image display area of the display device are separable from or combinable with each other under control of the computer program product in response to an operation of the indicator.

19. The drawing device of claim 16, wherein a peripheral portion of the test drawing area is controlled by the control circuit to be less transparent than at least one other portion of the test drawing area such that the at least one other portion of the test drawing area is displayed superimposed on the drawing in the image display area of the display device in a transparent and visually identifiable manner.

20. The drawing device of claim 16, wherein the control circuit causes the test drawing area to be displayed superimposed on the drawing in the image display area of the display device in response to the detection, by the sensor, of the indication operation by the indicator in the image display area of the display device such that a position where the indication operation was detected is included in the test drawing area.

* * * * *